Feb. 19, 1963 H. A. O'BRIEN 3,078,448
DUAL-CHANNEL SENSING
Filed July 15, 1957 12 Sheets-Sheet 2
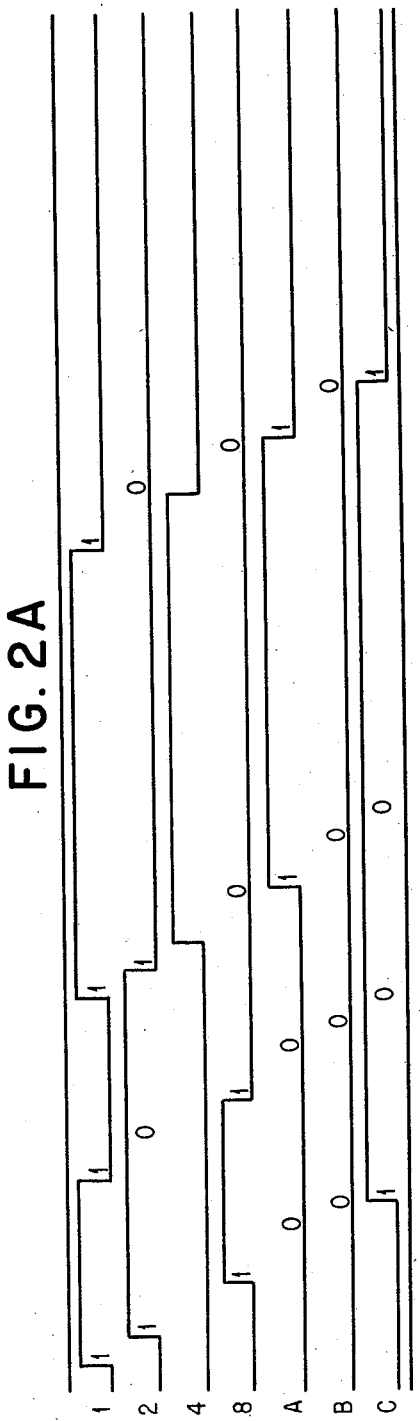
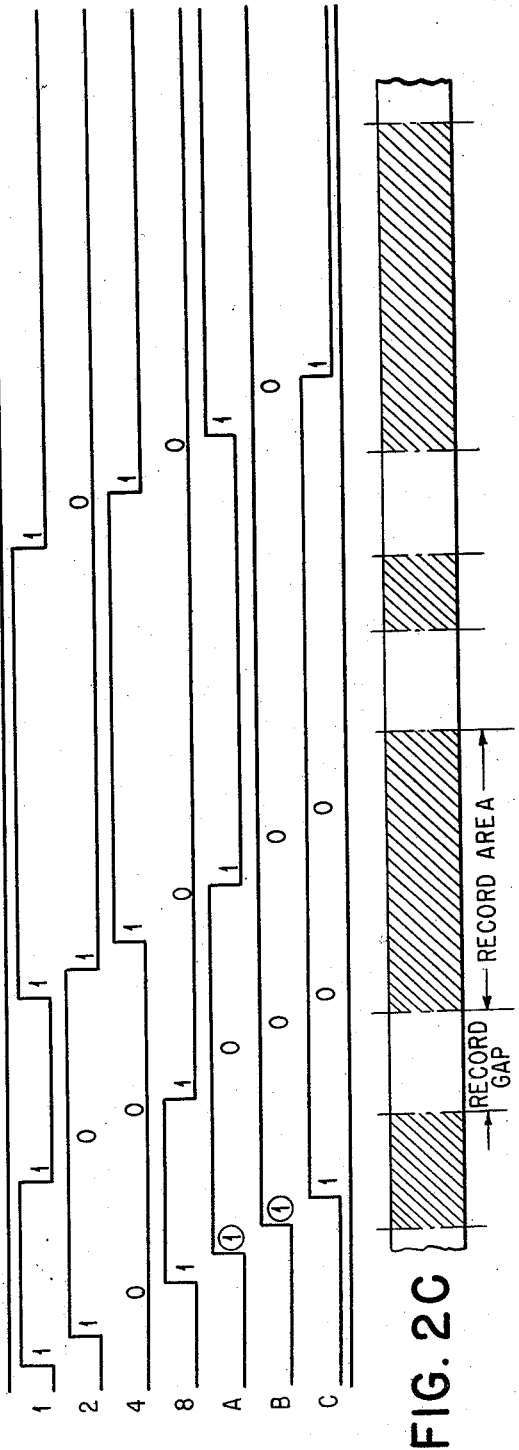

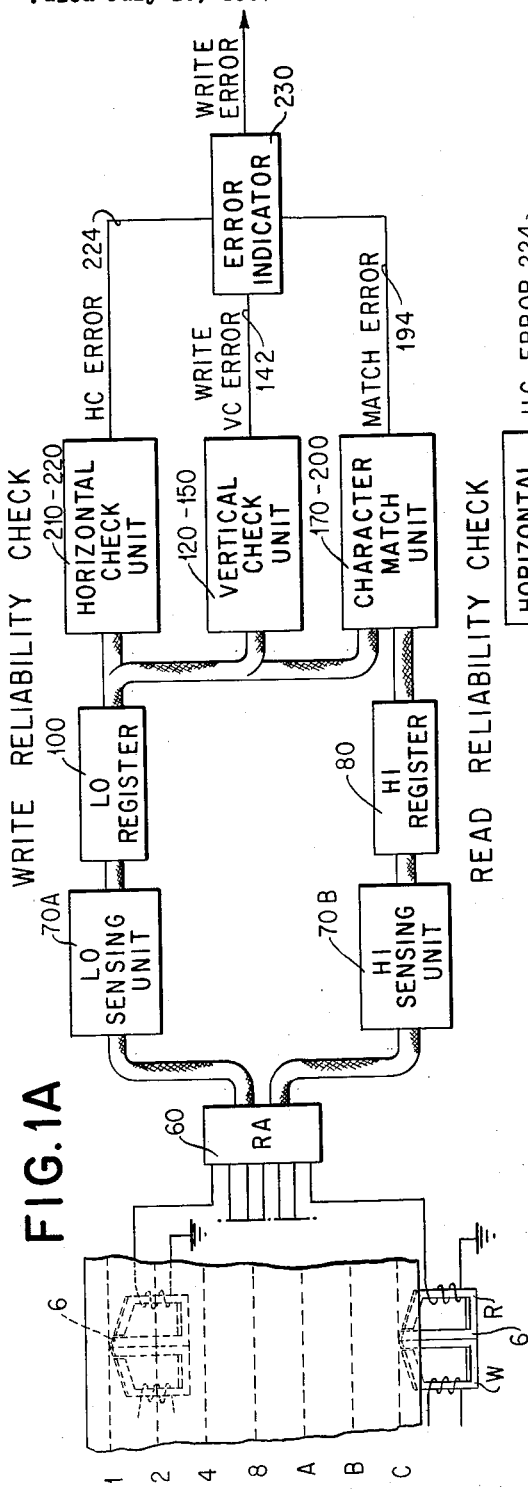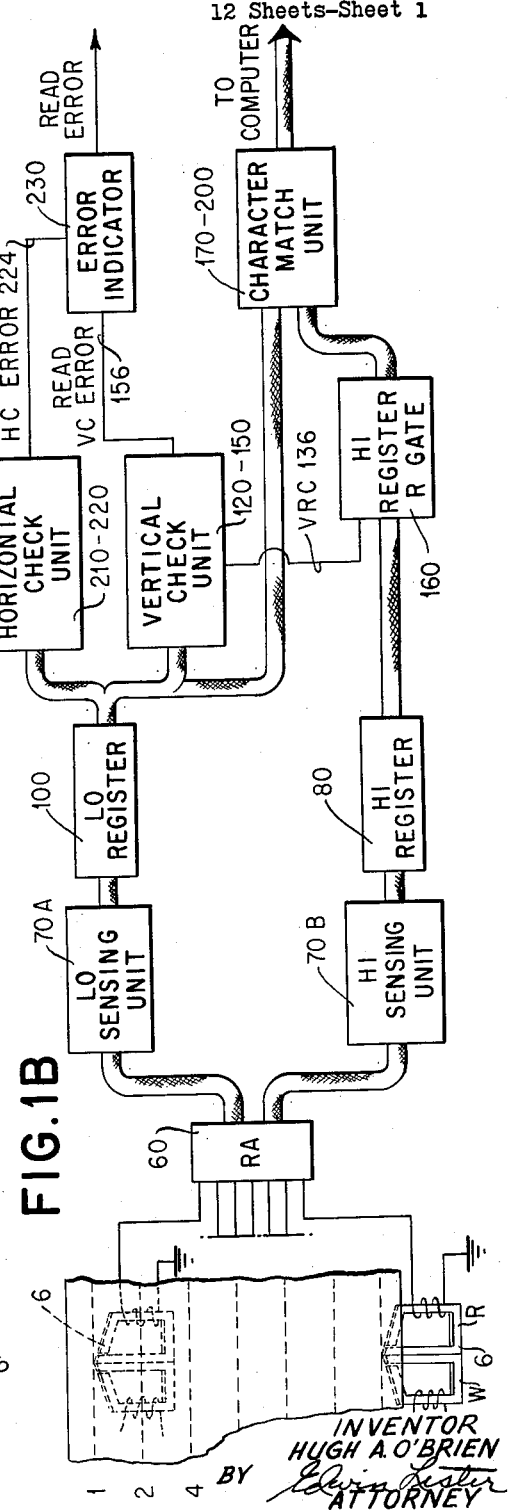

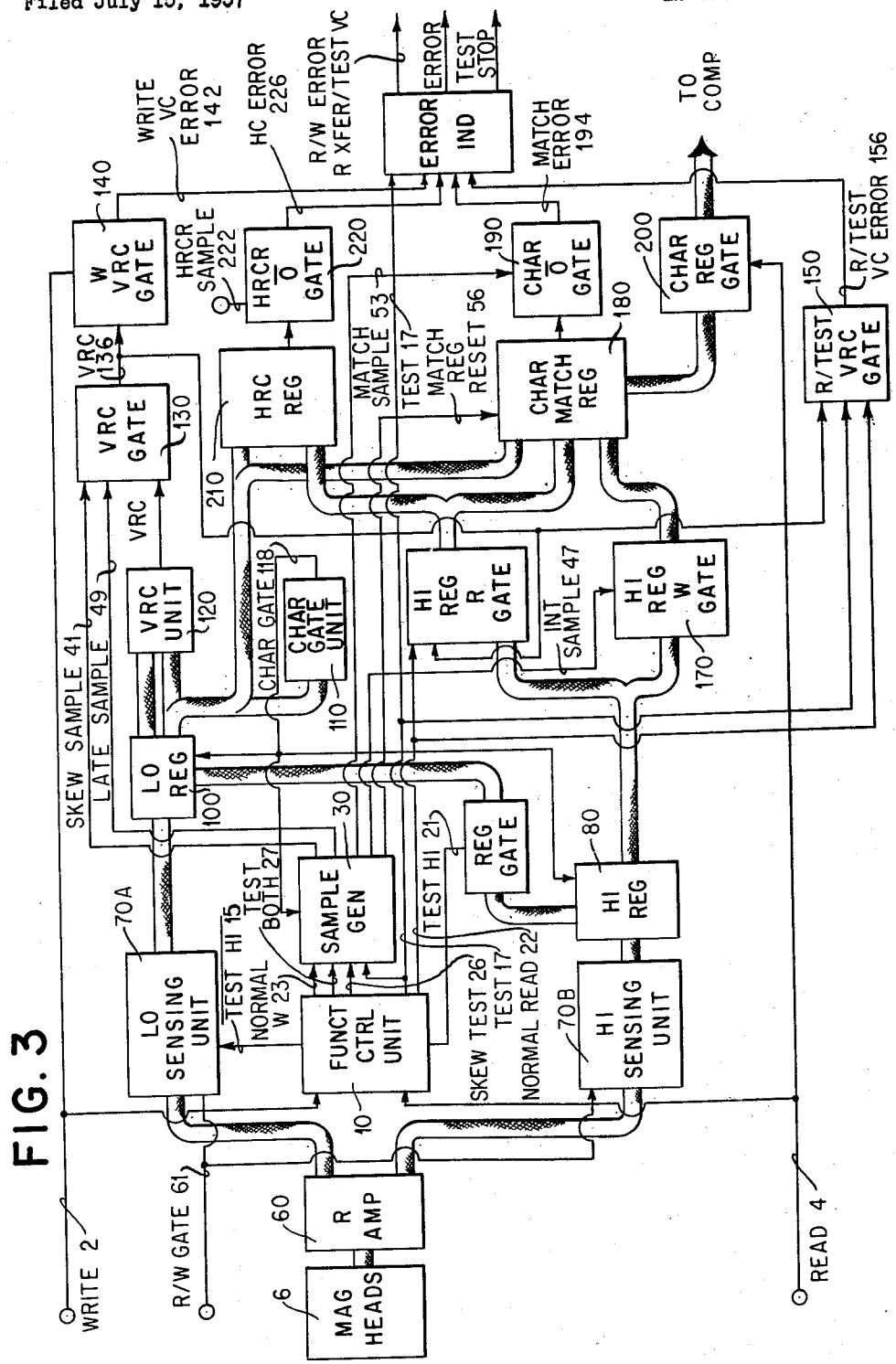

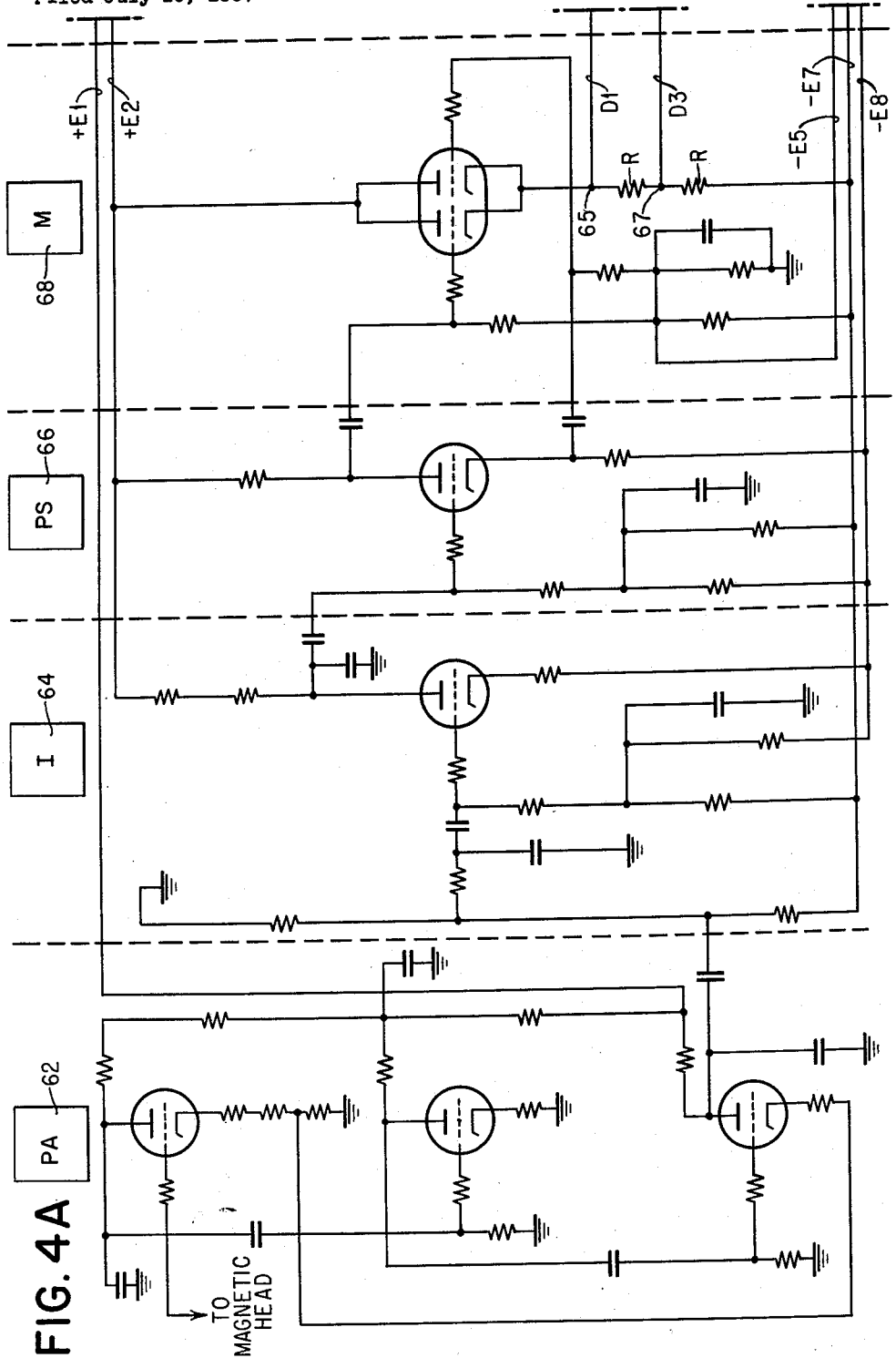

Feb. 19, 1963  H. A. O'BRIEN  3,078,448
DUAL-CHANNEL SENSING
Filed July 15, 1957  12 Sheets-Sheet 5
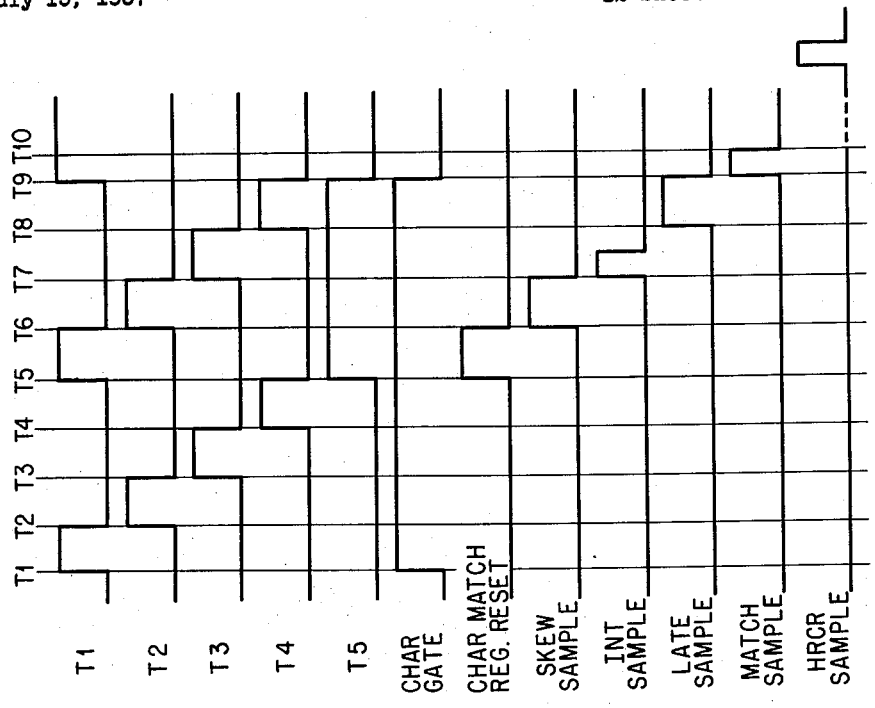
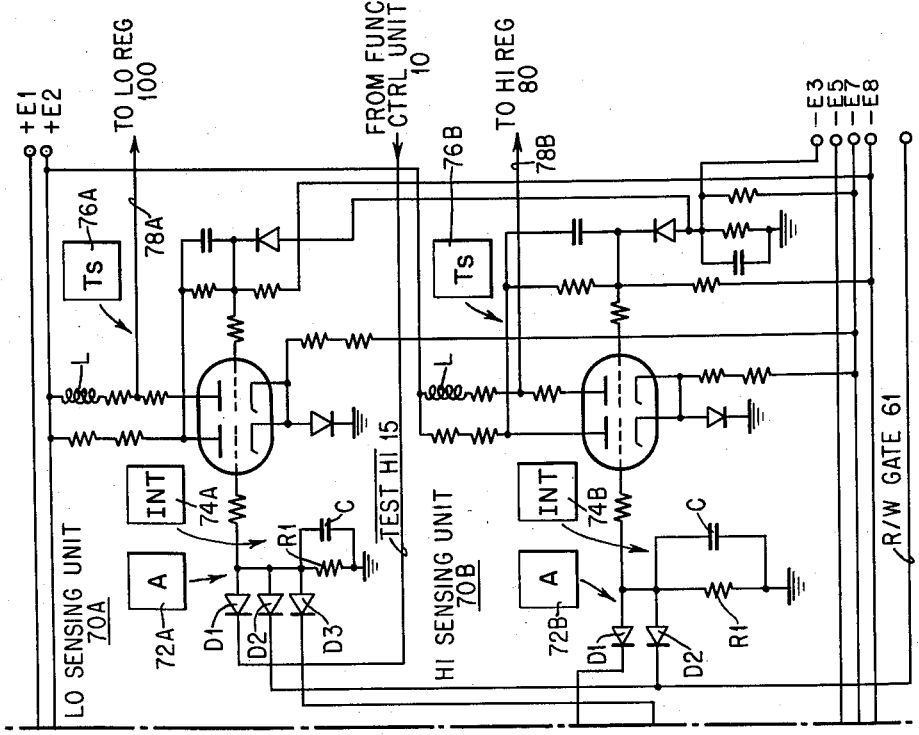

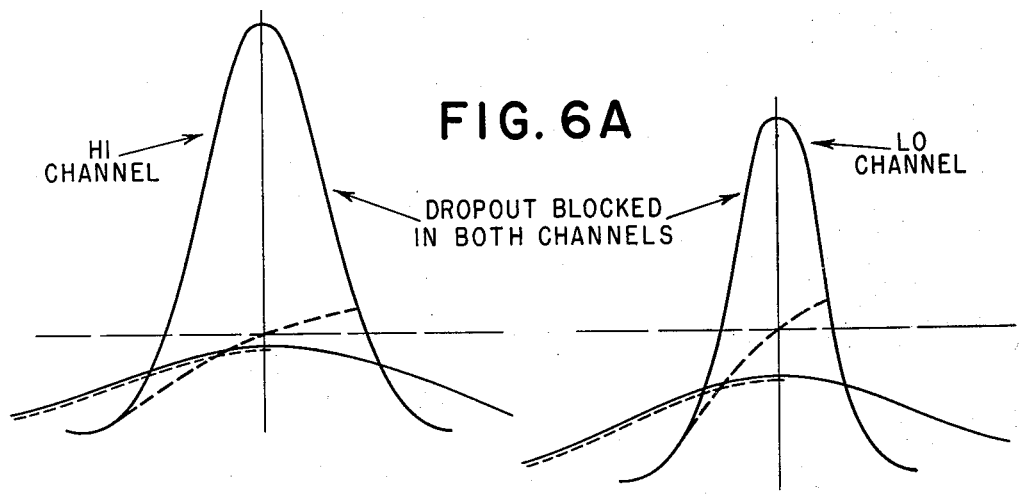
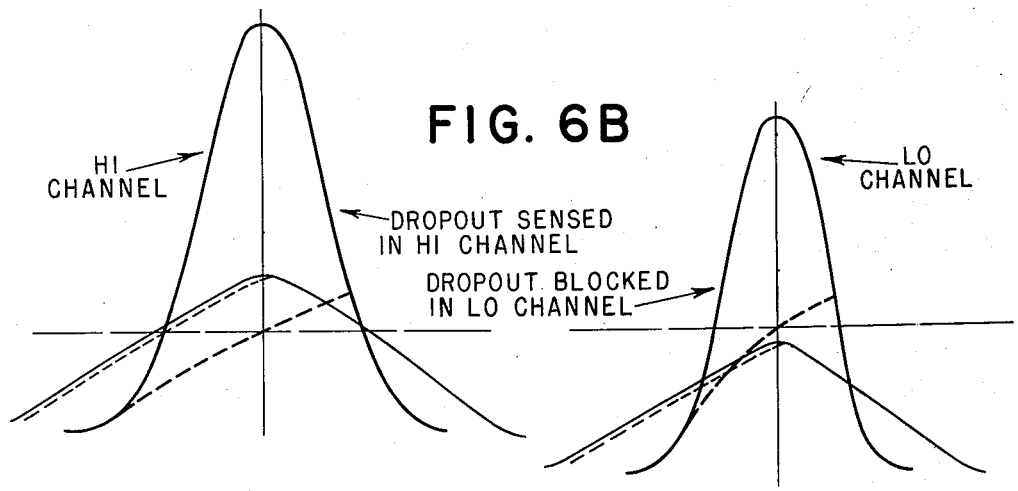
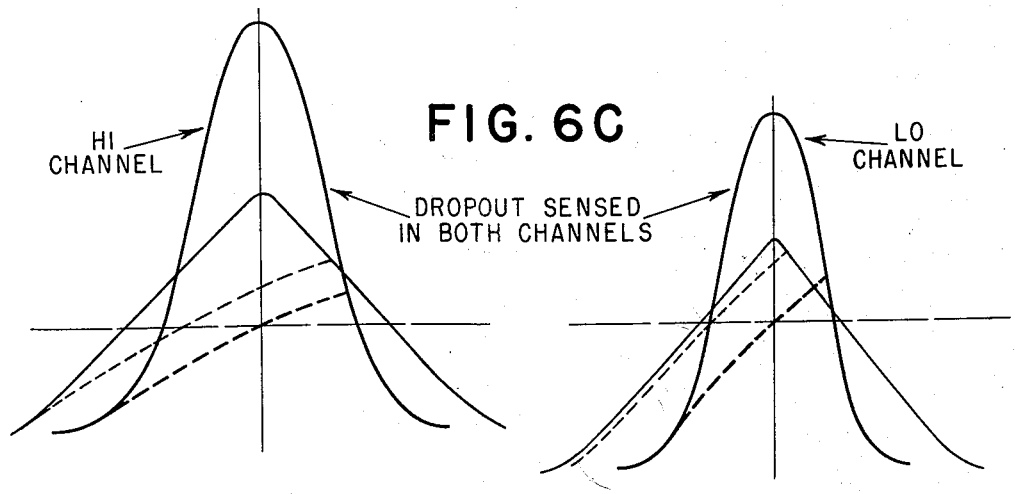

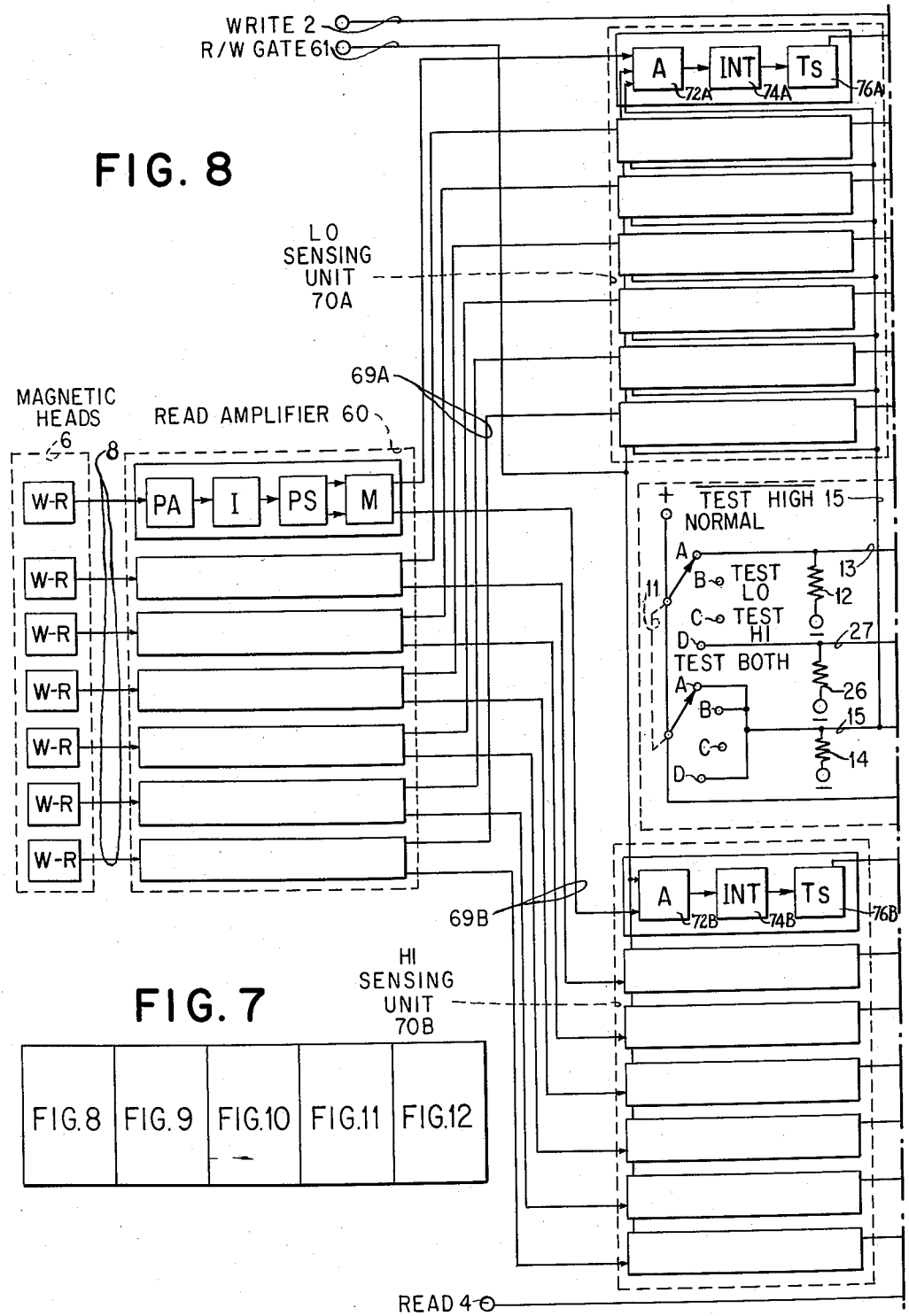

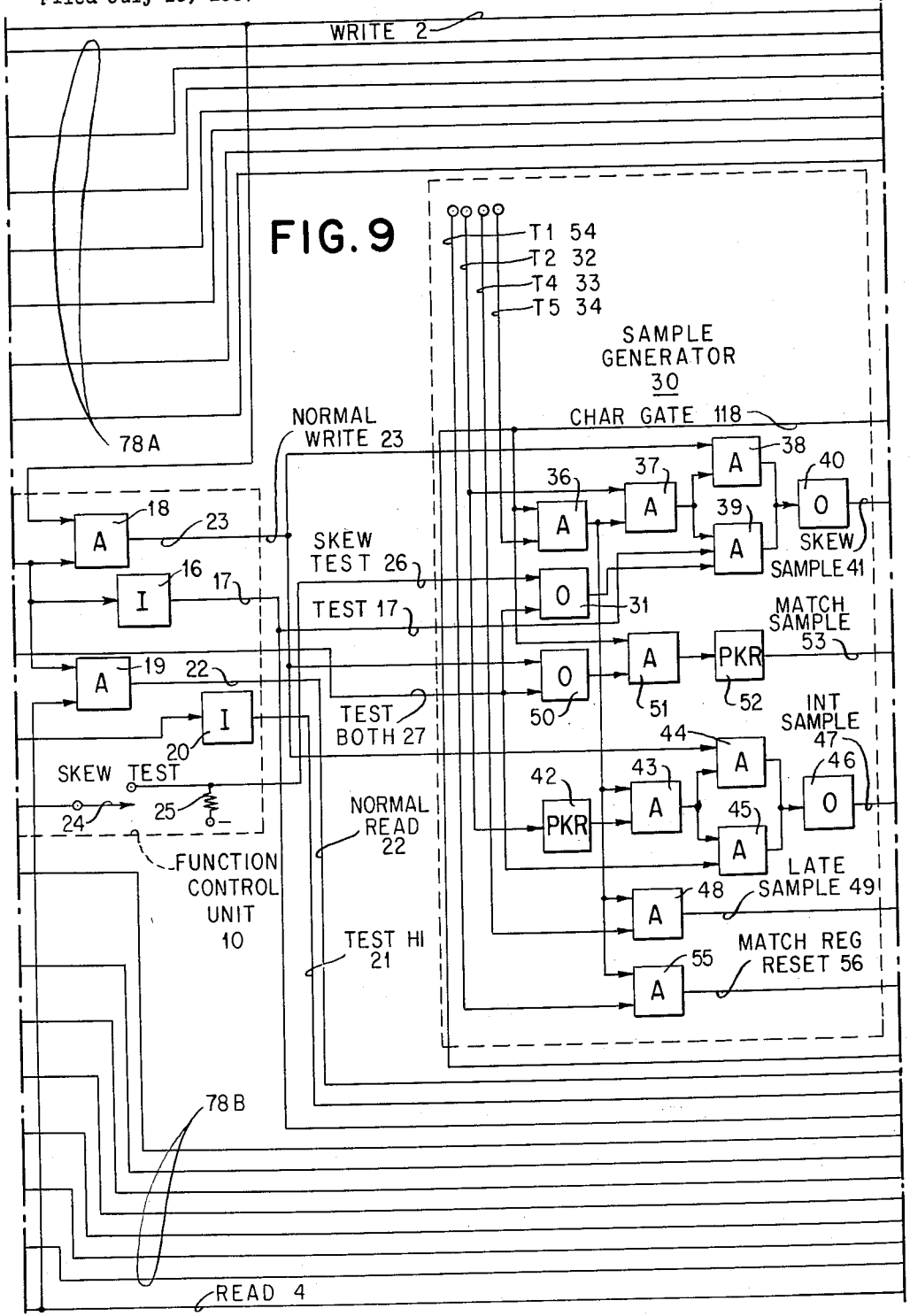

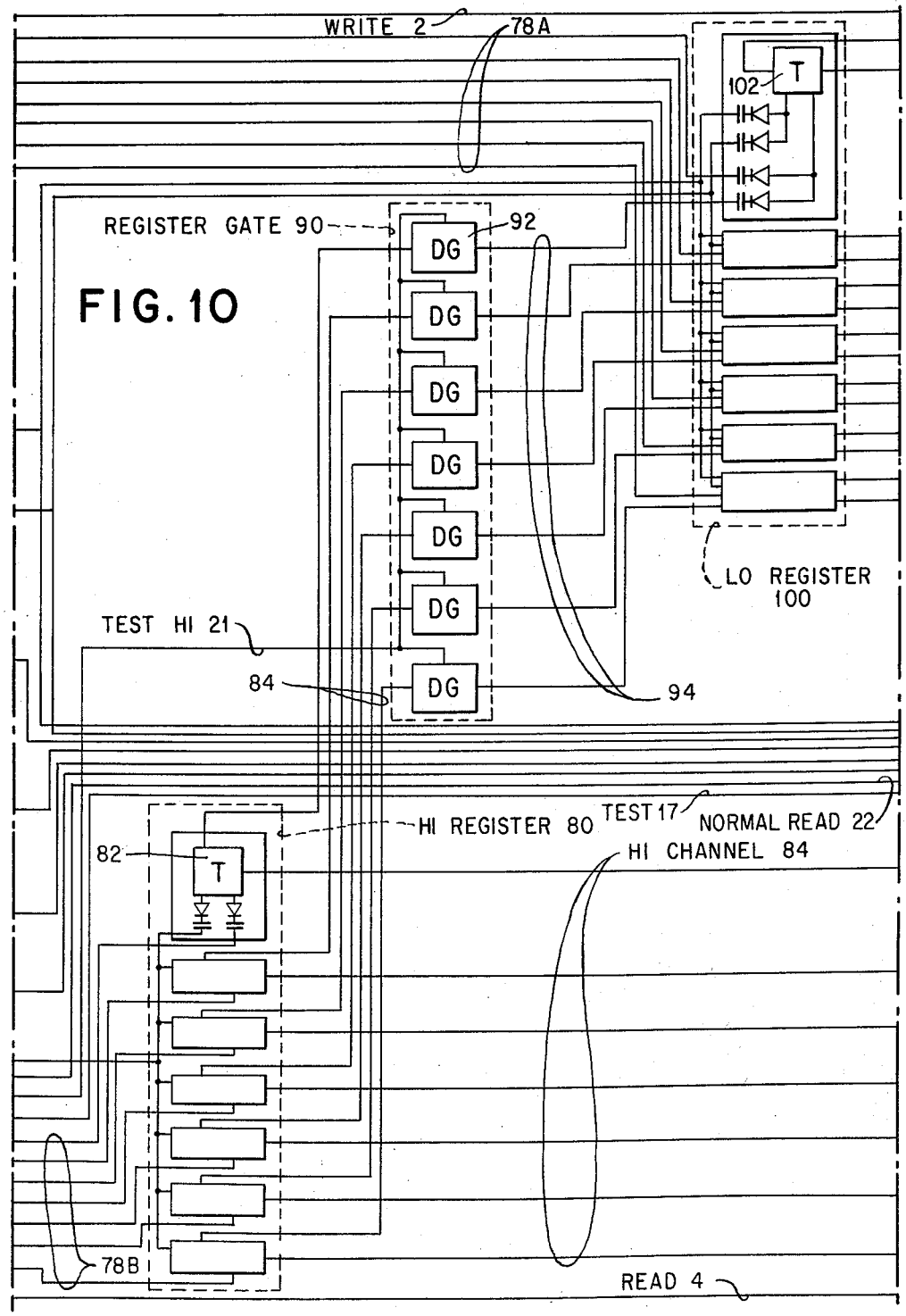

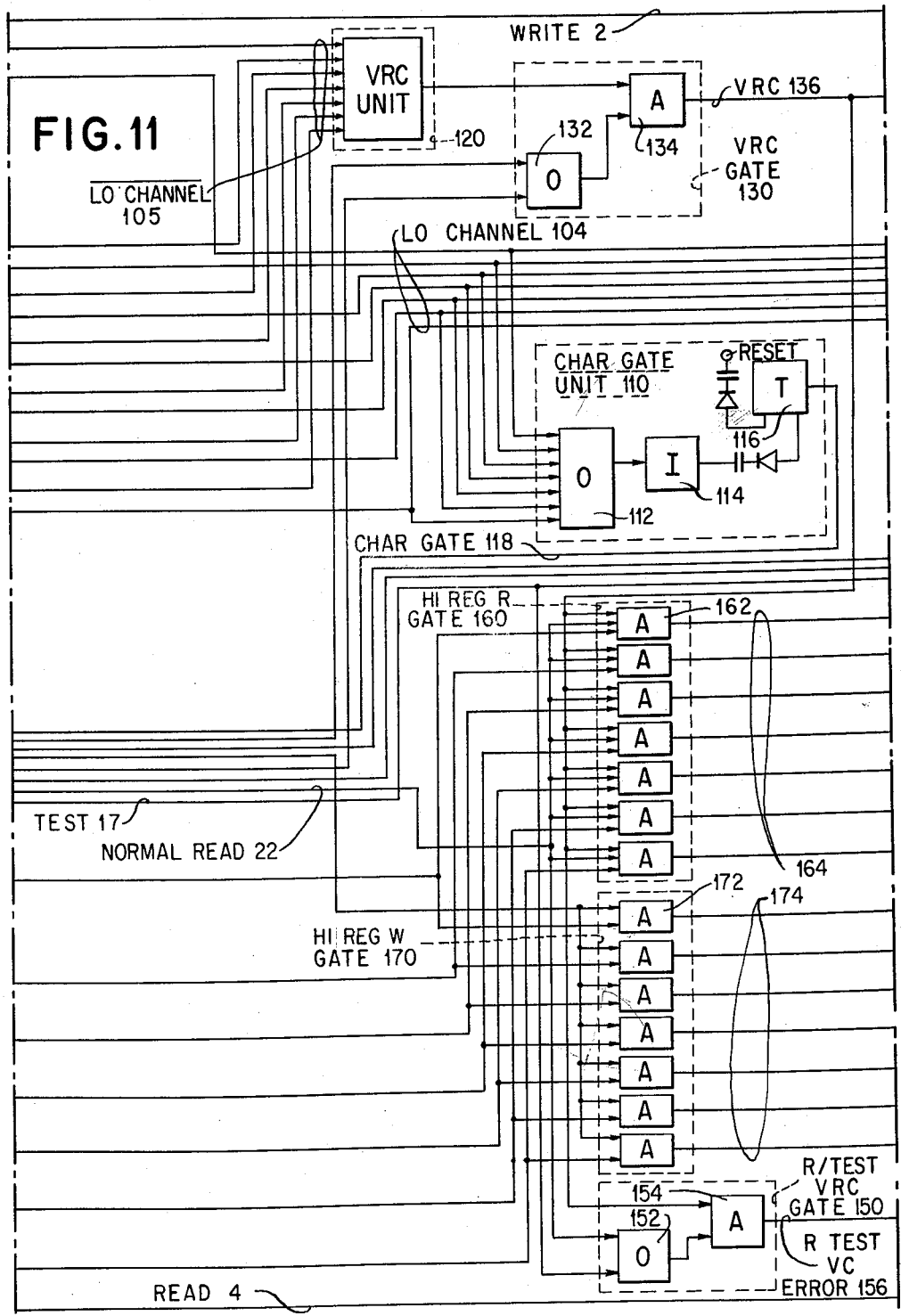

Feb. 19, 1963   H. A. O'BRIEN   3,078,448
DUAL-CHANNEL SENSING
Filed July 15, 1957   12 Sheets-Sheet 12

United States Patent Office 3,078,448
Patented Feb. 19, 1963

3,078,448
DUAL-CHANNEL SENSING
Hugh A. O'Brien, Wappingers Falls, N.Y., assignor to International Business Machines Corporation, New York, N.Y., a corporation of New York
Filed July 15, 1957, Ser. No. 671,834
14 Claims. (Cl. 340—174.1)

This invention relates to magnetic recording and reproducing and more particularly to an arrangement for improving the accuracy with which information is recorded upon and reproduced from magnetic tape.

Verification of recorded information on magnetic tape has heretofore been accomplished by stopping the tape after a write forward operation, backspacing the tape to the beginning of the record, stopping the tape again, then, forward spacing the tape to read the previously recorded information, during which, a check was made of the recorded information. If an error was detected during the read forward operation the tape was again stopped, backspaced to the beginning of the record, stopped again and then forward spaced to reread the recorded information to determine if the error persisted or was merely temporary in nature. A disadvantage of this reliability checking system is that the mechanical sequences require an excessive amount of time. Another disadvantage is that read signal characteristics are prone to change somewhat after this write check has been made.

A recent development which improves recording reliability is a two gap magnetic head which is fully described and claimed in the copending application Serial No. 580,894 filed April 26, 1956, now U.S. Pat. No. 2,922,231, in the names of Victor R. Witt et al., and assigned to the same assignee as the present application. The two gap magnetic head is a magnetic transducer having both a record and reproducing section which are physically very close together and yet are magnetically shielded from each other to permit simultaneous recording and reproducing without the recording interfering with the reproducing section. With this arrangement it should be realized that a character of information can be recorded at the same time that a previously recorded character of information is being reproduced and checked or, in other words, to permit a simultaneous write-read operation. Obviously, this simultaneous write-read operation avoids the mechanical sequencing of stopping the tape after a record forward operation, backspacing the tape to the beginning of the record, stopping the tape again and then forward spacing the tape to read and check the previously recorded information.

If an error persists and is not temporary in nature it is always due to either pickup or dropout. Pickup may be defined as unwanted signals or noise produced by transients in the system associated with the tape unit or noise produced by the tape itself due to splices, scratches or possibly minute particles of ferrous material which have become imbedded in the oxide layer of the magnetic tape. While the amplitude and shape characteristics of the noise signals can vary widely, it has been found that these signals are generally faster than normal signals, that is, they contain higher frequency components and are generally of lower amplitude than normal signals. Thus, after a read check operation, if an error is found to persist, an operation may be performed to determine if the error was due to pickup. This is accomplished by first backspacing the tape to the beginning of the record. Then, stopping the tape and adjusting the bias level of the read amplifier in a negative direction from the normal level to effectively decrease the sensitivity of the read amplifier and thereby amplitude discriminate against the low level noise signals. The magnetic tape is then forward spaced to reread and check the recorded information. If no error is detected during this low sensitivity level check operation it indicates that the original error was due to pickup. However, if an error is again detected during this check operation it is probably due to dropout.

Dropout may be defined as signals which are completely missing or which are too weak to be sensed at the normal sensitivity level of the read amplifier. The former may be produced by wearoffs and flakeoffs of the oxide coating, tears etc. while the latter may be produced by the magnetic decay of the tape or by the displacement or shim of the tape from the magnetic head caused by creases, wrinkles or oxide, acetate, mylar, or plain dirt depositing and building up on the oxide layer of the magnetic tape. Whatever the cause, the shim moves the tape away from the magnetic head thereby causing a weak signal to be recorded on the tape having the characteristics of low amplitude and increased base width. Thus, after the previous low sensitivity level check operation, if an error is found, an operation may be performed to determine if the error was due to dropout. This is accomplished by first backspacing the tape to the beginning of the record after the previous check operation. Then, the tape is stopped and the bias level of the read amplifier is increased in a positive direction from the normal level to effectively increase the sensitivity of the read amplifier to thereby accept the weak dropout signals which are actually wanted signals. The magnetic tape is then forward spaced to reread and check the recorded information. If no error is detected during this high sensitivity level check operation it indicates, in view of the previous low sensitivity level check, that the original error was due to a dropout signal.

Thus, this reliability checking operation requires stopping the tape, then, backspacing it to the beginning of the record, stopping the tape again, adjusting the bias level of the read amplifier, which may be done automatically, so that the read amplifier functions at a low sensitivity level thereby discriminating again noise, forward spacing the tape to read and check for an error, stopping the tape again if an error is detected, then, backspacing the tape to the beginning of the record, stopping the tape again, adjusting the bias level of the read amplifier so that it now functions at a high sensitivity level thereby picking up dropout signals and finally forward spacing the tape again to perform another read and check operation. Consequently, it should be apparent that this type of reliability checking consists of almost a duplicate sequence of operations which may be excessively time consuming.

Accordingly, an object of the present invention is to provide an improved arrangement for checking the reliability of recording and reproducing information.

Another object of the invention is to check the reliability of recording and reproducing information in a minimum of time.

Still another object of the invention is to provide an improved arrangement for sensing recorded information.

A further object of the invention is to simultaneously sense recorded information at different levels of sensitivity.

A still further object of the invention is to simultaneously record and check the reliability of the recorded information.

Another object of the invention is to record information while previously recorded information is simultaneously being reproduced and checked.

Still another object of the invention is to check recorded information by matching signals sensed at different levels of sensitivity.

Another object of the invention is to improve the reliability of reproduced information by sensing information at different levels of sensitivity and selecting that which is most correct.

Still another object of the invention is to provide an improved arrangement for determining excessive tape skew conditions.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1A is a functional block diagram illustrating how a write reliability check is performed with the dual-channel sensing arrangement of the present invention.

FIG. 1B is a functional block diagram illustrating how a read reliability check is performed with the dual-channel sensing arrangement of the present invention.

FIG. 2A is a representation of a tape section having a properly recorded record thereon.

FIG. 2B is a representation of a tape section having a pair of 1 bits appear erroneously in place of a pair of 0 bits in the encircled positions.

FIG. 2C is a representation of a tape section having variable length records recorded thereon.

FIG. 3 is an overall block diagram illustrating the general arrangement and interconnections of the components comprising the dual-channel sensing device.

FIG. 4A shows both the logical block symbols and the schematic circuit of the read amplifier used in the invention.

FIG. 4B illustrates both the logical block symbols and the schematic circuit of the sensing units used in the invention.

FIG. 6A illustrates a dropout pulse superimposed on a normal pulse in both the high channel and the low channel and being of such magnitude as to be blocked in both channels.

FIG. 6B shows a dropout pulse superimposed on a normal pulse in both the high channel and the low channel and being of such magnitude as to be sensed in the high channel and blocked in the low channel.

FIG. 6C illustrates a dropout pulse superimposed on a normal pulse in both the high channel and the low channel and being of such magnitude as to be sensed in both channels.

FIG. 7 illustrates how FIGS. 8 to 12, inclusive, may be placed to form a composite block diagram showing a breakdown, in logical block form, of the components comprising the dual-channel sensing device.

FIG. 8 shows the breakdown, in logical block form, of the magnetic heads, the read amplifier, the low sensing unit the high sensing unit and a portion of the function control unit.

FIG. 9 illustrates the breakdown, in logical block form, of the sample generator and the remaining portion of function control unit.

FIG. 10 shows the breakdown, in logical block form of the high register, the register gate and the low register.

FIG. 11 illustrates the breakdown in logical block form, of the vertical redundancy check unit, the vertical redundancy check gate, the character gate unit, the high register read gate, the high register write gate and the read/test vertical redundancy check gate.

FIG. 13 is a timing chart showing the various pulses produced in each character gate period during the reliability check made with the dual-channel sensing arrangement of the present invention.

Figure 5A:
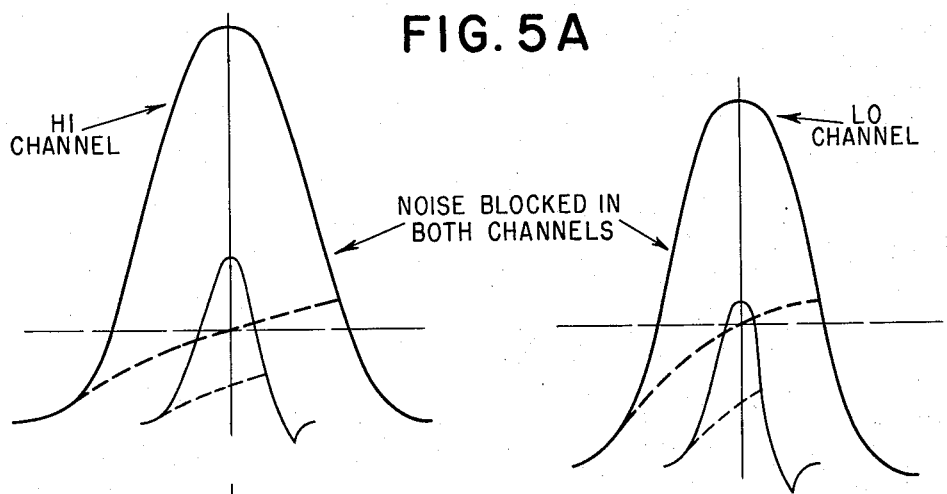
FIG. 5A shows a noise pulse superimposed on a normal pulse in both the high channel and the low channel and being of such magnitude and width as to be blocked in both channels.

Referring now to FIGS. 1A and 1B, there is illustrated, in block form, the dual-channel sensing arrangement of the present invention. This arrangement is used in conjunction with a magnetic tape upon which information is recorded by the NRZI (non-return-to-zero-IBM) method wherein the recording head always saturates the tape in one polarity or the other as illustrated diagrammatically in FIG. 2A. A 1 bit is recorded by reversing the current in the recording head so that the polarity of the saturation recording reverses at that point whereas a 0 bit is recorded by continued saturation in the same direction. Thus, when reproducing information from tape, a 1 bit is sensed by a change of flux whereas a 0 bit is sensed by the absence of a change of flux.

A character of information may be recorded on tape in a $n$ bit binary code which for example, may consist of a combination of six information bits and a check bit written transversely across the tape, that is, perpendicular to the edge of the tape. In the tape unit, the tape is passed between guides as it moves over the two gap head. These guides are designed for nominal tape width plus the maximum tolerance. However, if the width varies, the tape may pass loosely in the guide and become displaced so that the bits of a character of information, which are normally written perpendicular to the edge of the tape and read in parallel, may assume a slight angle to the edge of the tape, as illustrated in FIGS. 2A and 2B, resulting in serial rather than parallel reading of the bits of the character. This displacement is known as tape skew. The tracks corresponding to the six information bits may be referred to as the 1, 2, 4, 8, A and B tracks while the track corresponding to the check bit may be referred to as the C track. The check bit is recorded in the C track as either a 1 or a 0 so that, if an even parity check is selected, the total number of 1 bits in each correct character is always even or, if an odd parity check is chosen, so that the total number of 1 bits in each correct character is always odd.

During a tape writing or reading operation various checks are made of the information being written on or being read from the tape. Thus, one type of check which is made is a vertical check of each character written on or read from the tape. This may be an even parity check, performed on each character, to detect single bit errors such as occur when a 1 bit fails to be recorded or when a 1 bit is erroneously recorded so that an odd rather than even number of 1 bits appear in the character. Referring now to FIG. 2, in addition to the vertical check there is employed a horizontal check. This is an even parity check made of each track of the tape at the end of every record. Records recorded on tape consist of a variable number of characters of information with each record being separated by a record gap of, perhaps, a fraction of an inch, as shown in FIG. 2C, to allow sufficient time for stopping and starting the tape between records. After the last character of a record has been recorded on tape, an additional character, hereinafter referred to as the horizontal redundant check (HRC) character is recorded on the tape so that an even number of 1 bits is recorded in each track. The manner in which the HRC character is used to perform a horizontal check to detect double bit errors may be seen from FIGS. 2A and 2B, where 2A illustrates a properly recorded tape section and FIG. 2B illustrates an improperly recorded tape section in which a pair of 1 bits (circled) appear erroneously in place of pair of 0 bits in the first character.

Thus, when reproducing the information recorded on tape a vertical check is made, character-by-character, to insure that there are an even number of 1 bits in each character. Under the above assumed condition, where a pair of 1 bits appear in place of a pair of 0 bits, a vertical check detects no error inasmuch as there are an even number of 1 bits in the first character. However, during the tape reproducing operation an even count or horizontal check is made to insure that there are an even number of 1 bits recorded in a horizontal direction of each track. Under the above assumed condition, it will be noted from FIG. 2B that an odd count of 1 bits would be detected in tracks A and B indicating an error in these tracks. Hence, by making a vertical and horizontal check of the information being reproduced from the tape, both single and double bit errors will be detected. In addition to the vertical and horizontal check, a character match check is made to insure the correctness of the recorded character. This is a character comparison check whereby two versions of each character is reproduced and matched, bit for bit, as will be explained in greater detail hereinafter.

With a general understanding of the method by which information may be recorded on magnetic tape and the philosophy of the vertical, horizontal and match checking, a general description of the system will now be given with reference being made to FIGS. 1A and 1B.

General Description

Referring first to FIG. 1A, let it be assumed that a recording operation is to be performed, that is, information is to be written on the magnetic tape and a write reliability check is to be made of the recorded information. Consequently, as soon as a recording operation is called for, tape movement is initiated and a record consisting of a variable number of characters of information is transmitted serially, character-by-character, to the recording or write section W of the two gap heads 6 causing them to be recorded on the magnetic tape. As soon as the first character of information is sensed by the reproducing or read section R of the two gap heads 6 it is transferred via the read bus 8 to the read amplifier 60. The signals corresponding to the 1 bits of the character are amplified and rectified in the read amplifier 60 so that only positive pulses are produced at the output thereof. Rectification is necessary because of the bipolar characteristic of the signals reproduced from the tape due to the NRZI method of recording which saturates the tape in one polarity or the other. Additionally, for each 1 bit signal sensed by the read amplifier 60, two output signals are produced, in a manner as will be explained in greater detail hereinafter, which vary about two different D.C. levels and are of different amplitudes hereinafter referred to as the hi level and the lo level, the hi level being relatively positive with respect to the lo level.

The lo level signals are applied to the lo sensing unit 70A while the hi level signals are applied to the hi sensing unit 70B. The sensing units 70, which will be described in greater detail hereinafter, require that each signal received from the read amplifier 6 have at least a minimum amplitude and minimum pulse width in order to be sensed by the respective sensing units 70. Consequently since noise signals are generally lower in amplitude than normal signals and shorter in pulse width, most noise signals will be blocked except those which exceed the minimum amplitude and pulse width. Additionally, dropout signals, which are wanted signals, though low in amplitude are usually wider than normal signals and, therefore, need only reach the minimum amplitude required by the sensing units 70. It should be apparent that since the lo level signals are applied to the lo sensing unit 70A and the hi level signals are applied to the hi sensing unit 70B, the lo sensing unit 70A will discriminate more against noise signals than the hi sensing unit 70B while the hi sensing unit 70B will tend to accept dropout signals more readily than the lo sensing unit 70A. The output of the lo sensing unit 70A is applied to the lo register 100 while the output of the hi sensing unit 70B is applied to the hi register 80.

It will be remembered that, due to tape skew, the bits of a character are not necessarily recorded perpendicular to the edge of the tape and, consequently, the bits of the character may be reproduced in a serial rather than parallel manner. Consequently, taking into account the worst condition of tape skew, a period of time is provided which is sufficient to permit all the bits of a character to be reproduced and stored in the respective registers 80 and 100 before the character is transferred on.

As soon as the lo level character is stored in the lo register 100, signals corresponding to the bits of the character are applied to a vertical check unit 120—150 where an even parity check is made to determine if there are an even number of 1 bits in the lo level character. At the proper time, the vertical check unit 120—150 is sampled to determine if a vertical check error was detected. If the lo level character is valid no error is detected but if a bit or bits drop out of the lo level character, then a vertical check error is detected and a write VC error signal is applied via line 142 to an error indicator 230 which, in turn, signals a write error.

Now, assuming no vertical check error is detected, the lo level character stored in the lo register 100 is transferred to and stored in both the character match unit 170—200 and the horizontal check unit 210—220. Following this, the output of the hi register 80 is sampled so that the hi level character stored therein is effectively gated to the character match unit 170—200 where a match check is made, bit-for-bit, between the lo level character and the hi level character. At the proper time, the character match unit 170—200 is sampled to determine if a mismatch was detected. If the lo level character and the hi level character are identical, as they will be if no pickup or dropout occurred at the hi level then, no error is detected but if a bit or bits drop out of the lo level character or a bit or bits are picked up in the hi level character due to noise signals which resemble valid read signals, then, a mismatch is detected and a match error signal is applied via line 194 to the error indicator 230 which, in turn, signals a write error.

In a similar manner, the reliability of each character recorded on the tape is vertically checked for correctness followed by a character match check. Hence, it should be apparent that with this dual-channel sensing arrangement, both channels are verified and if no error is detected it insures reliably recorded information free of pickup or dropout.

Additionally, it will be recalled, that each character reproduced from the magnetic tape is transferred to the horizontal check unit 210—220 where a horizontal check is made to insure that there are an even number of 1 bits recorded in a horizontal direction of each track. Consequently, at the end of each record, after the HRC character is reproduced and transferred to the horizontal check unit 210—220, the horizontal check unit 210—220 is sampled to determine if an odd count was made. If the count in each track is even no error is detected but, if the count in any track is odd this condition is detected and a neon tube or tubes are lit identifying the track in error and a HC error signal is applied via line 224 to the error indicator 230 which, in turn, signals a write error.

Provision is also made for detecting excessive tape skew. This is accomplished in one instance simply by sampling the vertical check unit 120—150 at a time prior to the end of the character gate period. Thus, if the tape skew is excessive so that a 1 bit is reproduced subsequent to this early or skew sample, then, assuming that the character is a valid character, that is, one having an even number of 1 bits, an odd number of 1 bits is reproduced prior to the skew sample. This condition is detected by the vertical check unit 120—150 and, when the skew sample is made, a write VC error signal is applied via line 142 to the error indicator 230 which, in turn, signals a write error. It should be noted that a situation may exist whereby excessive tape skew will not be detected in the vertical check unit 120—150, namely, when an even number of 1 bits occur before and after the early sample. However, under such a circumstance, the error is detected in the character match unit 170 to 200 just prior to the end of the character gate period. For example, let it be assumed that just prior to the skew sample an even number of 1 bits of a character are reproduced from the tape and stored in the lo register 100 and the hi register 80. The output of the lo register 100 is applied to the vertical check unit 120—150 which detects no error inasmuch as there are an even number of 1 bits in the character reproduced so far. Consequently, when the skew sample is made in the vertical check unit 120—150 no error is signalled. Following this, the lo level character is transferred and stored in the character match unit 170—200. Now, let it be assumed that during the interval from the end of the skew sample to the time that the hi level character is transferred to the character match unit 170—200 that a pair of 1 bits are reproduced from the tape and stored in the lo register 100 and the hi register 80. Following this, the hi level character with the extra pair of 1 bits is transferred to the character match unit 170—200 where a mismatch is detected between the lo level character and the hi level character. Therefore, when a match sample is made in the character match unit 170—200, the mismatch is detected and a match error signal is applied via line 194 to the error indicator 230 which, in turn, signals a write error. If the excessive tape skew is continuous, the detection thereof indicates a possibly defective tape unit and corrective measures may then be taken.

Another situation which may occur is the pickup of noise during the interval from the end of the early sample to the end of the character gate. Since this pickup will cause an invalid character to be reproduced, that is, one having an odd number of 1 bits, this condition is detected by the vertical check unit 120—150 during this period of time. Consequently, a late sample is made in the vertical check unit 120—150 at the end of the character gate period and if a vertical check error is detected, a write VC error signal is applied via line 142 to the error indicator 230 which, in turn, signals a write error.

At the end of the character gate period, both the lo register 100 and the hi register 80 are reset in preparation for receiving the next character of information while the character match register 170—200 is reset during the early portion of each character gate period.

It should now be apparent, from the foregoing, that in the dual-channel sensing arrangement of the present invention, with the vertical and horizontal check of information recorded on magnetic tape and with the match check, where verification of recorded information is made at different levels of sensitivity, excessive tape skew and both single bit and double bit errors, due to pickup or dropout, will be detected. Consequently, an error free write operation insures a highly reliable recording.

Referring now to FIG. 1B, let it be assumed that information previously recorded on magnetic tape is to be reproduced and transferred to a computer and a read reliability check is t be made of the reproduced information. It should be noted that, in view of the write reliability check previously made, the recorded information on the tape should be highly reliable.

As soon as a reproducing operation is called for, tape movement is initiated and a recorded record is reproduced serially, character-by-character, at the reproducing or read section R of the two gap heads 6. Again, as soon as the first character of information is sensed by the reproducing section R of the two gap heads 6 it is transferred via the read bus 8 to the read amplifier 60 where it is amplified and rectified and for each one bit signal sensed two output signals are produced which vary about the two different D.C. levels, and are of different amplitudes, namely, the lo level and the hi level. The lo level signals are applied to the lo sensing unit 70A while the hi level signals are applied to the hi sensing unit 70B. As before, since noise signals are generally lower in amplitude than normal signals and shorter in pulse width, most noise signals are blocked by the sensing units 70 except those which exceed the minimum amplitude and pulse width. Additionally, since dropout signals are usually wider than the normal signals they need only reach the minimum amplitude required by the sensing units 70. Therefore, as before, since the lo level signals are applied to the lo sensing unit 70A, the lo sensing unit 70A will discriminate more against noise signals than the sensing unit 70B while since the hi level signals are applied to the hi sensing unit 70B, the hi sensing unit 70B will tend to accept dropout signals more readily than the lo sensing unit 70A. The output of the lo sensing unit 70A is applied to the lo register 100 while the output of the hi sensing unit 70B is applied to the hi register 80.

As soon as the lo level character is stored in the lo register 100, signals corresponding to the bits of the character are applied to the vertical check unit 120—150 where an even parity check is made to determine if there is an even number of 1 bits in the lo level character. Again, as before, a character gate period is provided to allow sufficient time for all the bits of the characters to be reproduced and stored in the respective registers 80 and 100. At the end of the character gate period, the vertical check unit 120—150 is sampled to determine if a vertical check error was detected. If the lo level character is valid no error is detected and the lo level character is gated to the horizontal check unit 210—220 and via the character match unit 170—200 to the computer. However, if a bit or bits drop out of the lo level character, due to an effective shim between the tape and the head surface, or other reason then, a vertical check error is detected and a read V.C. error signal is applied via line 156 to the error indicator 230 which, in turn, signals a lo channel read error. Additionally, upon detection of a vertical check error, a positive VRC signal is applied via line 136 to condition the hi register read gate 160 to permit the bits of the hi level character to be transferred from the hi register 80 via the hi register read gate 160 to the character match unit 170—200. Since the hi sensing unit 70B is set at a hi level it will accept the bit or bits dropped out of the lo level character and cause them to be stored in the hi register 80. Consequently, the bit or bits which drop out of the lo level character appear in the hi level character and are gated to the character match unit 170—200 upon detection of a vertical check error in the lo level character so that a valid character is now stored in the character match unit 170—200, the output of which is applied to the computer. Thus, it should be apparent that a valid lo level character is always transferred to the computer unless a vertical check error is detected causing the hi level character, containing those bits which dropped out of the lo level character, to be effectively transferred to the computer.

High reproducing reliability is evidenced by the continuous transfer of lo level characters from the magnetic tape to the computer. When the dual-channel sensing arrangement begins to have resort to the hi level characters for correct information this condition will be indicated by the detection of a vertical check error and corrective measures may be taken.

Some element of interrecord noise elimination is obtained by not initiating the transfer of information to the computer until the first bit of a character is sensed in the low sensitivity channel. Since the computer accepts information normally from the lo sensitivity channel and since the lo sensing unit 70A discriminates against the noise, noise signals picked up in the interrecord gap areas of the tape will be blocked from passing to the computer despite the fact that they will be sensed in the hi sensitivity channel.

Additionally, each character reproduced from the magnetic tape is transferred to the horizontal check unit 210—220 where a horizontal check is made to insure that there are an even number of 1 bits recorded in a horizontal direction of each track. Consequently, at the end of each record, after the HRC character is reproduced and transferred to the horizontal check unit 210—220, the horizontal check unit 210—220 is sampled to determine if an odd count was made. If the count in each track is even no error is detected but if the count in any track is odd this condition is detected and a neon tube or tubes are lit identifying the track in error and an HC error signal is applied via line 224 to the error indicator 230 which, in turn, signals a read error.

It should now be apparent, from the foregoing, that in the dual-channel sensing arrangement of the present invention, with the vertical and horizontal check of information reproduced from magnetic tape, both single and double bit errors, due to pickup or dropout, will be detected and with the vertification of reproduced information made at different levels of sensitivity, the most correct form of the information is transferred to the computer.

*System Organization*

To facilitate the understanding of the invention, resort has been had to two levels of drawings. The first level shows in simplified block form the general arrangement and interconnections of the components comprising the dual-channel sensing device. The second level of drawings is a composite diagram showing a breakdown, in logical block form, of the components of the dual-channel sensing device and the intra-connections between the logical blocks within each component as well as the interconnections between the logical blocks of each component.

The type of logical circuits represented by the rectangles in the composite block diagram consist of "or" circuits (O), "and" circuits (A), "inverter" circuits (I), "diode gate" circuits (DG), "peaker" circuits (PKR), "trigger" circuits (T) having separately operable set and reset inputs and "binary trigger" circuits ($T_B$) having commonly operable set and reset inputs all of which are well known in the art. Examples of suitable types of these logical circuits are fully described in the copending application Serial No. 592,545 filed June 20, 1956, in the names of Wayne D. Winger et al. and assigned to the same assignee as the present invention. Throughout the detailed description of the operation of the dual-channel sensing device no reference will be made to logically passive elements such as cathode followers, level setters and the like. It should be obvious that the characteristics of these elements vary and are largely determined not only by the component load but also by the length of conductors coupling one component to another. Therefore, in a specific construction of the device in accordance with the principles of the present invention, the passive elements may be used wherever and in any manner that is deemed necessary.

Referring now to FIG. 3, there is shown in block form the general arrangement and inter-connections between the components comprising the dual-channel sensing device. The single lines connecting the several components of the device indicate paths through which timing and control signals will flow. The cables or busses connecting the several components of the device indicate paths through which information will flow.

Before proceeding to a detailed description of the dual-channel sensing device, a description will be given of a novel arrangement for sensing recorded information at different levels of sensitivity.

Referring now to FIGS. 4, a diagram is shown illustrating the details of the read amplifier 60 and the sensing units 70A and 70B. The read amplifier 60 is composed of a three stage preamplifier (PA)62, an amplifying inverter (I)64, a phase splitter (PS)64 and a mixer (M)66. It will be remembered that due to the NRZI method of recording, 1 bits reproduced from the magnetic tape will be bipolar. Consequently, the input to the preamplifier 62 will vary from +E volts to —E volts with the variations being in the form of positive and negative pulses. These positive and negative pulses are applied to the grid of the first stage of the preamplifier 62 and are amplified by successive stages of the preamplifier 62 and by the inverter 64 causing amplified positive and negative pulses to appear at the plate of the inverter 62 and be applied to the grid of the phase splitter 66. When the grid of the phase splitter 66 goes positive, due to a positive pulse applied thereto, conduction in the phase splitter 66 increases and the potential at the anode of the phase splitter 66 goes negative while the potential at the cathode goes positive due to the increased drop in potential across the resistance in the anode and cathode circuits, respectively. When the grid of the phase splitter 66 goes negative, due to a negative pulse applied thereto, conduction in the phase splitter 66 is reduced and the potential at the anode of the phase splitter 66 goes positive while the potential at the cathode goes negative due to the decreased drop in potential across the resistance in the anode and cathode circuits, respectively. The anode of the phase splitter 66 is coupled to the left grid of the mixer 68 while the cathode of the phase splitter 66 is coupled to the right grid of the mixer 68. The same bias potential is applied to the left grid and right grid, of the mixer 68. The bias level is such that both triodes of the mixer 68 are normally partially conducting and providing a current path from the —E5 source via the resistors R through the two triodes in parallel, to the +E2 source. In this quiescent state junction 65 is at a D.C. level of —E4 volts while junction 67 is at a D.C. level of —E6 volts which is slightly more negative than that at junction 65. Now, let it be assumed that two successive 1 bits are reproduced from the magnetic tape. Further, let it be assumed, that the first 1 bit reproduced from the tape causes a positive pulse to be applied to the preamplifier 62 and the next 1 bit reproduced from tape causes a negative pulse to be applied to the preamplifier 62. The positive 1 bit pulse is amplified by the preamplifier 62 and the amplifying inverter 64 and is applied to the grid of the phase splitter 66 increasing conduction therethrough thereby causing a negative pulse to be applied from its anode to the grid of the left triode of the mixer 68 and causing a positive pulse to be applied from its cathode to the grid of the right triode of the mixer 68. The negative pulse at the grid of the left triode of the mixer 68 causes the left triode to be cut off while the positive pulse at the grid of the right triode of the mixed 68 causes increased conduction through the right triode. The increased conduction through the right triode causes the potential at both junctions 65 and 67 to rise thereby applying positive pulses to the sensing units 70A and 70B. The negative 1 bit pulse is amplified by the preamplifier 62 and the inverter 64 and is applied to the grid of the phase splitter 66 decreasing conduction therethrough thereby causing a positive pulse to be applied from its anode to the grid of the left triode of the mixer 68 and causing a negative pulse to be applied from its cathode to the grid of the right triode of the mixer 68. The negative pulse at the grid of the right triode of the mixer 68 causes the right triode to be cut off while the positive pulse at the grid of the left triode of the mixer 68 causes increased conduction through the left triode. The increased conduction through the left triode causes the potential at both junctions 65 and 67 to rise thereby applying positive pulses to the sensing units 70A and 70B. Thus, it should be apparent that the bipolar input pulses applied to the read amplifier 60 are amplified and rectified and for each 1 bit pulse applied to the read amplifier 60, two positive output pulses are produced which vary about two different D.C. levels, that at junction 65 being at the more positive potential, and of somewhat larger amplitude, is hereinafter designated as the lo level while that at junction 67 being at the more negative potential and of less amplitude is hereinafter designated as the hi level.

The sensing units 70 consist of an AND circuit 72 an integrating circuit 74 and a Schmitt type trigger 76. The Schmitt type trigger differs from the regular type trigger in that it is turned on when the potential at the grid of the left hand tube rises above a threshold level and is turned back off when the potential at the grid of the left hand tube drops below a threshold level regardless of the slope or duration of the pulse. Hence, when a positive pulse is applied to the trigger it will be turned on so long as the leading edge of the pulse reaches the threshold level and will be turned off as the trailing edge of the pulse falls below the threshold level. In actual operation, the input to the trigger is normally at a relatively negative potential and, consequently, the left hand tube is cut off while the right hand tube is conducting with the cathodes of the tubes clamped to ground by a clamping diode. When the potential at the input of the trigger reaches the threshold level, the left hand tube conducts causing the anode potential to drop which effect is coupled via an RC circuit to the grid of the right hand tube causing it to be cut off with the inductance in the anode circuit of the right tube speeding this shift. When the right hand tube is cut off the lead lines 78 connected in the anode circuits experiences a positive shift of potential which condition is applied to the lo register 100 and the hi register 80, respectively. When the potential at the input of the trigger drops below the threshold level, the left hand tube is cut off causing the anode to experience a positive shift in potential which condition is coupled via the RC circuit to the grid of the right hand tube causing it to conduct once again with the peaking coil aiding this shift. When the right hand tube again conducts the lead lines 78 connected in the anode circuits the anode experiences a negative shift in potential which condition is applied to the lo register 100 and the hi register 80, respectively. Thus, a positive input pulse whose amplitude is greater than the threshold value will cause the trigger to produce a sharp positive output pulse.

Diodes D1 and D2 of the AND circuit 72A and diode D2 of the AND circuit 72B are normally at a positive potential to condition the respective AND circuits 72A and 72B so that the positive pulses applied from the junctions 65 and 67 of the mixer 68 will pass via the AND circuits 72A and 72B, respectively, to the integrating circuits 74A and 74B. The leading edge of the output pulse from the AND circuit 72A and 72B tend to follow the charging curve of the capacitor C which charges to ground through resistors R1. The integrated leading edge of the pulses are then applied to the grids of the respective triggers 76A and 76B. The RC time constant is selected so that triggering occurs at about the mid point of a normal pulse. Hence, if a pulse is lower in amplitude than the normal pulse, then, since the outputs of the AND circuit 72 are integrated, the amplitude reached by these lo signals may not be sufficient to reach the threshold level and cause the triggers 76 to be switched. Thus, with this arrangement, lo amplitude noise signals will be discriminated against which effect is desired. Additionally, if the amplitude of a noise pulse is relatively large compared with that of the normal reproduced signal, then, the width of the pulse must be large enough to permit the integrated leading edge of the pulse to reach the threshold level, otherwise, if the width is too small as compared to the RC period, the integrated pulse leading edge of the pulse will not have sufficient time to reach the threshold level and cause the trigger to be turned on. Thus, the sensing units 70 place a restriction on the input pulses applied thereto, that is, each signal received from the read amplifier 69 must have at least a minimum amplitude and pulse width in order to be sensed by the triggers 76. Since noise signals are generally lower in amplitude than normal signals and shorter in pulse width, the sensing units 70 will discriminate against these noise signals but permit the normal signals to pass through. Furthermore, since the D.C. potential at the junction 67 is lower than that at the junction 65, then, the amplitude of the noise pulses must be greater in order to be sensed by the lo sensing unit 70A or, in other words, the lo sensing unit 70A discriminates more against noise than the hi sensing unit 70B.

Also, as previously described dropout signals, which are wanted signals, are generally low in amplitude but wider than normal signals. Since the width of these signals are larger than the minimum required, then, these signals need only reach the threshold level in order to be sensed.

Additionally since the D.C. potential at the junction 65 is higher than that at the junction 67, then, the amplitude of the dropout pulse applied to the hi sensing unit 70B need not be as high as that applied to the lo sensing unit 70A or in other words, the hi sensing unit 70B will tend to accept dropout signals more readily than the sensing unit 70A.

Referring now to FIG. 5A, there is shown a noise pulse superimposed upon a normal pulse in both the hi channel and the lo channel. In the situation shown, the noise pulse is small in amplitude and narrow in pulse width. The dotted line associated with each pulse curve represents the integrated leading edge of the pulse applied to the triggers 76 in the sensing units 70. The horizontal dotted line is the threshold level at which the trigger will be switched. It will be apparent from FIG. 5A, that in the situation shown the integrated leading edge of the normal pulse in both the hi and the lo channel will reach the threshold level causing the trigger to be switched whereas in both instances the integrated leading edge of the noise pulse will be insufficient to reach the threshold value and switch the trigger.

Referring now to FIG. 5B, there is shown again a noise pulse greater in amplitude and pulse width than that shown in FIG. 5A, superimposed upon a normal pulse in both the hi channel and the lo channel. In this instance, it will be apparent that the noise pulse will be sensed in the hi channel but will be blocked in the lo channel. With this condition the vertical check unit 120—150 associated with the lo channel will not detect an error. However, since the noise is picked up in the hi channel the character match unit 170—200 will detect the discrepancy in the two channels when writing. When reading, only the lo level character is gated to the computer unless an error is detected. Consequently, the error picked up in the hi channel is simply ignored.

Figure 5B:
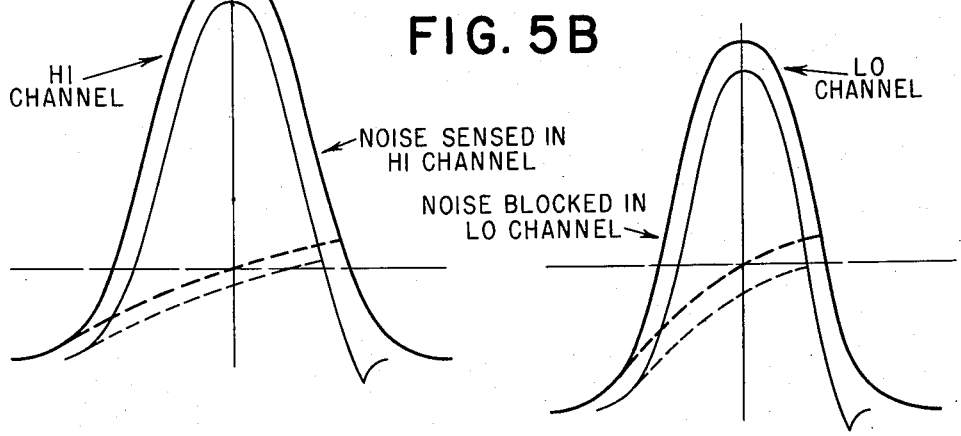
FIG. 5B illustrates a noise pulse superimposed on a normal pulse in both the high channel and the low channel and being of such magnitude and width as to be sensed in the high channel and blocked in the low channel.

Referring now to 5C, there is shown again two noise pulses, greater in amplitude and pulse width than that shown in either FIGS. 5A or 5B, superimposed upon the normal pulse in both the hi channel and lo channel. In this situation, the noise pulse is of such amplitude and pulse width that it is sensed in both the hi channel and the lo channel. However, note, that if the noise pulse had been narrower in width, as it normally is, as shown by the third curve associated with the lo channel, then, even though the amplitude was greater than the minimum required the width would be so narrow that the integrated leading edge of the noise pulse would be insufficient to reach the threshhold level. Additionally, in this situation where noise is detected in both channels the vertical check unit 120—150 associated with the lo channel will detect this error when writing or reading.

Referring now to FIG. 6A, a situation is shown wherein a dropout signal is superimposed upon a normal signal in both the hi channel and the lo channel. In the situation shown, the amplitude of the dropout pulse is insufficient to reach the threshold level and switch the trigger. It should be noted that the rise of the dropout pulse is so slow that the integrated leading edge of the pulse, shown as a dotted line, will actually follow the curve of the dropout pulse. Also, it should be remembered that dropout will generally cause an odd number of 1 bits to be sensed which condition is detected in the vertical check unit 120—150 when writing or reading.

Referring now to FIG. 6B, there is shown two dropout signals, the amplitudes of which are greater than that shown in FIG. 6A, superimposed upon a normal pulse in both the hi channel and the lo channel. In the situation shown, the dropout signal is sensed in the hi channel but not in the lo channel because the amplitude is not sufficient to reach the threshold value required to switch the trigger. Consequently, this condition will be detected by the vertical check unit 120—150 when writing or reading. Lastly, referring to FIG. 6C, there is shown two dropout signals, the amplitudes of which are greater than that shown in FIGS. 6A or 6B, superimposed upon a normal pulse in both the hi channel and the lo channel. In the situation shown, the dropout pulse in both channels are sufficient in magnitude to reach the threshold value and switch the triggers in the sensing units 70.

Thus, it should be apparent that the sensing units 70 will, within the limits provided, discriminate against most pickup and yet be sensitive enough to accept most dropout.

*Write Reliability Checking*

A write reliability checking operation will now be described in detail and reference may be made to the overall block diagram of FIG. 3 showing the general arrangement and interconnections between the components comprising the dual-channel sensing device as well as to the detailed logical block diagrams shown in FIGS. 8 to 12, inclusive. Also, reference may be made to the timing diagram of FIG. 13 to aid in understanding the sequence of events in the present operation.

Figure 12:
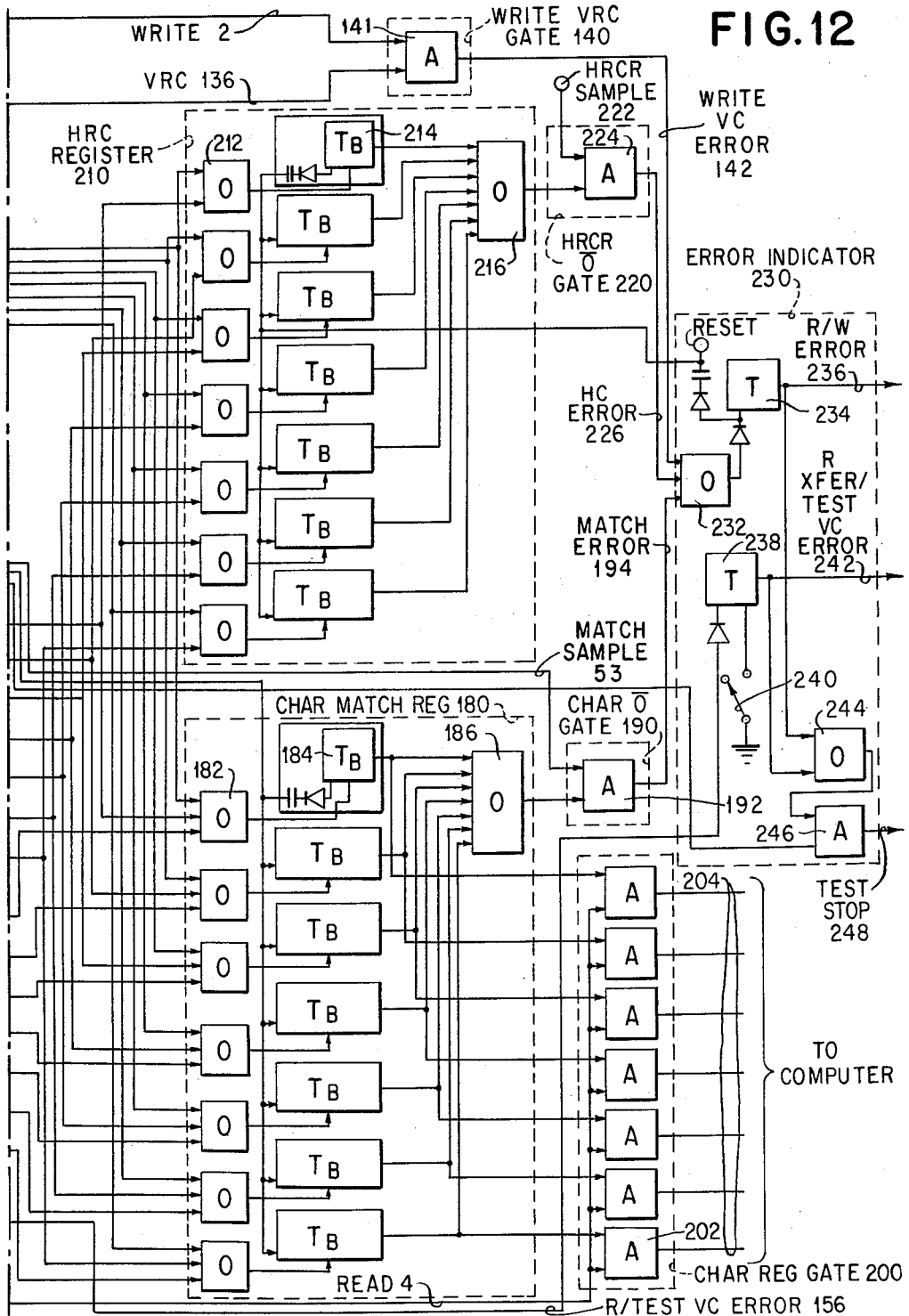
FIG. 12 shows the breakdown in logical block form, of the write vertical redundancy check gate, the horizontal redundancy check register, the horizontal redundancy check register $\bar{0}$ gate, the character match register, the character $\bar{0}$ gate, the character register gate and the error indicator.

Referring first to FIG. 12, a negative reset pulse is applied to reset the binary triggers 214 of the HRC register 210, in preparation for making a horizontal check, and to reset the R/W check trigger 234 in the error indicator 230, in preparation for signalling a write error if and when such is detected.

Referring now to FIG. 8, the function control unit 10 is shown as including a function switch 11 consisting of a four position double pole switch, the contact arms of which are connected together to a + plus source of potential. Position A is the normal position when performing either a normal write or read reliability check. Position B is the test lo position for checking the reliability of recorded or reproduced information in only the lo channel. Position C is the test hi position for checking the reliability of recorded or reproduced information in only the hi channel. Position D is the test both position for checking the reliability of recorded or reproduced information in both the lo and hi channel.

Since a write reliability checking operation is to be performed, the switch 11 is manually set to position A for the normal operation. Consequently, a positive signal is applied from the + source of potential via the contact arms of switch 11 to the normal line 13 and the test hi line 15. The positive signal on the normal line 13 is applied to the inverter 16 where it is inverted to a negative signal and applied to the test line 17 which is maintained negative during this entire operation. The positive signal on the normal line 13 is also applied to condition and the AND circuits 18 and 19. The positive signal on the test hi line 15 is applied to the inverter 20 where it is inverted to a negative signal and applied via the test hi line 21 to decondition the diode gates 92 of the register gate 90 in FIG. 10 during this entire operation to prevent transfer of the hi level version of a character to the lo register 100 which is done only during a test hi operation when it is desired to make a vertical redundancy check of the hi level version of information.

Now, as soon as the write operation is called for, the tape unit is signalled to initiate movement of the magnetic tape and a positive signal is applied to and maintained on the write line 2 and the R/W gate line 61 during the entire write operation. The positive signal on the write line 2 is applied to condition the AND circuit 141 in the write VRC gate 140 in FIG. 12 and also passes via the now conditioned AND circuit 18 in FIG. 9 to the normal write line 23. The positive signal on the normal write line 23 is applied to the sample generator 30 where it is applied to condition the AND circuits 38 and 44 and also via the OR circuit 50 to condition the AND circuit 51. Clock pulses are continuously applied to the sample generator 30, however, the sample generator 30 does not respond thereto until such time as a character gate signal is received as it will be for each character reproduced from the tape.

Referring now to the lo sensing unit 70A and the hi sensing unit 70B in FIG. 8, the AND circuits 72A in the lo sensing unit 70A are conditioned by the positive signals on the test hi line 15 and the R/W GATE line 61 while the AND circuits 72B in the hi sensing unit 70B are conditioned by the positive signal on the R/W GATE line 61.

At the proper time, a record consisting of a variable number of characters of information is transmitted, character-by-character, to the write portion of the magnetic heads 6 causing the record to be recorded on the magnetic tape. As soon as the first character of information passes above the reproducing section of the magnetic heads 6, the 1 bits of the characters are sensed and applied via the read bus 8 to the read amplifier 60 where they are amplified and rectified and for each 1 bit signal sensed two positive output signals are produced, in a manner as previously described, which vary about two different DC levels, namely, the lo level and the hi level. The lo level 1 bit pulses are applied via bus 69A to the now conditioned AND circuits 72A in the lo sensing unit 70A while the hi level 1 bit pulses are applied via bus 69B to the AND circuits 72B in the hi sensing unit 70B. Since the AND circuits 72A and 72B, to which the 1 bit pulses are applied, are presently conditioned, these positive 1 bit pulses are passed therethrough and are integrated by the integrating circuits 74A and 74B, respectively, and then applied to switch the associated ones of the triggers 76A and 76B. Assuming no dropout, when the leading edge of the 1 bit pulses reach the threshold level of the triggers 76, these triggers are switched on and when the trailing edge of the 1 bit pulses fall below the threshold level these triggers are switched back off.

Referring now to FIGS. 8 to 10, those of the triggers 76 in the sensing units 70 which are switched back off apply a negative shift of potential via bus 78A and 78B to corresponding ones of the triggers 102 in the lo register 100 and to corresponding ones of the triggers 82 in the hi register 80, respectively, causing these triggers to be turned on so that the lo level version of the first character is stored in the lo register 100 and the hi level version of the first character is stored in the hi register 80. Those triggers 102 of the lo register 100 which are turned on cause positive signals to be applied to corresponding lines of the lo channel 104 and negative signals to be applied to corresponding lines of the $\overline{\text{lo channel}}$ 105, while those triggers 82 of the hi register 80 which are turned on cause positive signals to be applied to corresponding lines of the hi channel 84.

The combination of signals on the $\overline{\text{lo channel}}$ 105 are applied to the vertical redundancy check (VRC) unit 120 while the combination of signals on the lo channel 104 are applied to the character gate unit 110, the character match register 180 and the horizontal redundancy check (HRC) register 210. One type of vertical redundancy check unit that may be used is fully described in the previously mentioned copending application Serial No. 592,545 filed June 20, 1956 in the names of Wayne D. Winger et al. and assigned to the same assignee as the present application. The VRC unit 120 functions to sense the output of the lo register 100 and produce a positive signal to condition the AND circuit 134 in the VRC gate 130 if an odd number of 1 bits are detected in the character stored in the lo register 100 whereas the VRC unit 120 produces a negative signal to decondition the AND circuit 134 in the VRC gate 130 if an even number of 1 bits is detected in the character stored in the lo register 100.

As soon as the first 1 bit of the first character is stored in one of the triggers 102 of the lo register 100, a positive signal is applied from the right hand output of that trigger to the character gate unit 110. Since the right hand output of each of the triggers 102 of the lo register 100 is connected to the OR circuit 112, in the character gate unit 110, then, as soon as a positive signal appears on one of these output lines it passes via the OR circuit 112 to the inverter 114 where it is inverted to a negative signal and is applied to turn on the character gate trigger 116 which, in being turned on, applies a positive shift of potential to the character gate line 118. The positive shift of potential on the character gate line 118 is applied to negative shift inputs of the triggers 82 and 102 in the hi register 80 and the lo register 100, respectively, and consequently has no effect thereon, at the present time, inasmuch as these inputs of the respective triggers 82 and 102 respond only to negative shifts of potential. Likewise, the positive shift of potential is also applied to the sample generator 30 where it is passed via the now conditioned AND circuit 51 to the peaker 52 having no effect thereon inasmuch as the peaker also responds only to negative shifts of potential. The positive shift of potential on the character gate line 118 is also applied to condition the AND circuit 36.

Referring now to the sample generator 30, in conjunction with the timing diagram of FIG. 13, at the next T5 time, a positive clock pulse is applied to the T5 line 34, which passes via the now conditioned AND circuit 36 to condition the AND circuits 37, 43, 48 and 55. It should be noted that the T5 line 34 remains up from T5 time to T9 time and, consequently, the AND circuits 37, 43, 48 and 55 will remain conditioned during this period of time. At the same time, namely, T5 time, a positive clock pulse is applied to the T1 line 54, which passes via the now conditioned AND circuit 55 causing a positive shift of potential to be applied on the character register reset line 56 which condition has no effect on the binary triggers 184 of the character match register 180 in FIG. 12, due to the negative shift reset inputs thereof. However, following this at T6 time, the negative trailing edge of the positive clock pulse on the T1 line 54 deconditions the AND circuit 55 causing a negative shift of potential to be applied via line 56 to reset all of the triggers 184 of the character match register 180 in preparation for receiving both versions of the first character.

Also at T6 time, a positive clock pulse is applied to the T2 line 54 which passes to the peaker 42, having no effect thereon inasmuch as it only responds to a negative shift of potential, and via the now conditioned AND circuits 37 and 38 via the OR circuit 40 to the skew sample line 41. The positive pulse on the skew sample line 41 passes via the OR circuit 132 in the VRC gate 130 in FIG. 11 to the AND circuit 134. If, at this time, all of the bits of the first character have been reproduced from tape and stored in the lo register 100 and no dropout occurred, the VRC unit 120 will detect no error, causing a negative signal to be applied to decondition the AND circuit 134 in the VRC gate 130 so that when the skew sample pulse is applied thereto it will be blocked from passing through to signal an error. However, if an error is detected by the VRC unit 120, due to dropout or excessive tape skew, then, the VRC unit 120 will apply a positive signal to condition the AND circuit 134 so that the skew sample pulse will pass therethrough and via the VRC line 136 to the write VRC gate 140. The write VRC gate 140 consisting of the AND circuit 141 is conditioned by the positive signal maintained on the write line 2 so that if a positive signal appears on the VRC line 136 it passes via the now conditioned AND circuit 141 to the error indicator 230, via the write VC error line 142, where it is applied via the OR circuit 232 to turn on the R/W check trigger 234 which, in being turned on, applies a positive signal to the R/W error line 236 to signal a write error.

At T7 time, the negative trailing edge of the positive pulse on the skew sample line 41 is applied via negative shift inputs to reset all of the triggers 102 of the lo register 100. Those of the triggers 102 which are turned off, corresponding to the 1 bits of the first character, apply negative shift of potential from their right hand outputs via corresponding ones of the lines of the lo channel 104 to the character match register 180 and the HRC register 210. The negative shifts of potential on the various ones of the lines of the lo channel 104 pass via corresponding ones of the OR circuits 212 in the HRC register 210 to turn on corresponding ones of the binary triggers 214 to initiate the horizontal check and also pass via corresponding ones of the OR circuits 182 in the character match register 180 to turn on corresponding ones of the binary triggers 184 whereby the first character is effectively stored in both the character match register 180 and the HRC register 210. At the same time, the negative trailing edge of the positive clock pulse on the T2 line 32 is applied to the peaker 42 which produces a positive pulse in response thereto which passes via the now conditioned AND circuits 43 and 44 and the OR circuit 46 to the intermediate sample line 47 where it is applied to the hi register write gate 170 consisting of the AND circuits 172 presently conditioned in accordance with the hi level character stored in the hi register 80. Those of the AND circuits 172 conditioned by the positive signals on the hi channel 84, corresponding to the 1 bits of the first character, cause the positive pulse on the intermediate sample line 47 to pass therethrough and via the bus 174 and corresponding ones of the OR circuits 182 in the character match register 180 to corresponding ones of the triggers 184 where the negative trailing edge of the positive pulse is effective to switch the triggers. If the lo level version of the first character that was stored in the lo register 100 at skew sample time is identical to the hi level version of the first character that is stored in the hi register 80, then, it should be apparent that the triggers 184 of the character match register 180 which were turned on when the lo level character was transferred thereto will now be turned off when the hi level character is stored therein. However, if one or more 1 bits drop out of the lo level version of the first character but are picked up in the hi level version of the first character or, if the tape skew is excessive so that a bit is not sensed in the lo level version of the character by the end of the skew sample time when the lo level character is transferred to the character match register 180 but is sensed in the hi level version of the character before the end of the intermediate sample time when the hi level character is transferred to the character match register 180, then, certain ones of the triggers 184 of the character match register 180 will be turned on when the hi level character is transferred to and stored therein causing a positive signal or signals to be applied from their right hand outputs via the OR circuit 186 to condition the AND circuit 192 in the character 0̄ gate 190. This condition will be detected by a match sample as will be explained hereinafter.

Referring now to the sample generator 30 in FIG. 9, at T8 time, a positive clock pulse is applied via the T4 line 33 which passes via the now conditioned AND circuit 48 to the late sample line 49. The positive pulse on the late sample line 49 is applied to the VRC gate 130 to check if any noise was picked up during the interval from the skew sample time to the late sample time. If an odd bit pulse was picked up during this interval of time, due to excessive tape skew or noise, the VRC unit 120 would detect this condition and produce a positive signal to condition the AND circuit 134 in the VRC gate 130. Consequently, at T8 time, when the late sample pulse passes via the OR circuit 132 in the VRC gate 130 to the AND circuit 134, if an error had been detected, the AND circuit 134 would be conditioned and the late sample pulse would pass therethrough and via the conditioned write VRC gate 140 to the error indicator 230 where it is applied via the OR circuit 232 to turn on the R/W check trigger 234, which, in being turned on, applies a positive signal to the R/W error line 236 to signal a write error. However, if no error had been detected by the VRC unit 120, during this interval of time, then, the AND circuit 134 in the VRC gate 130 would be deconditioned to block the late sample pulse from passing therethrough to initiate a R/W error signal.

Referring again to the sample generator 30 in FIG. 9 and the character gate unit 110 in FIG. 10, at T9 time, a negative reset pulse is applied to turn off the trigger 116 in the character gate unit 110 which, in being turned off, applies a negative shift of potential to the character gate line 118 to decondition the AND circuit 51 causing a negative shift of potential to be applied to the peaker 52 which responds thereto by producing a positive pulse on the match sample line 53 which is applied to the character $\bar{0}$ gate 190. It will be remembered that if the hi level character matches the lo level character, then, all of the triggers 184 of the character match register 180 are turned off at the time when the hi level character is stored therein, and, in being turned off, apply negative signals from their right hand outputs via the OR circuit 186 to decondition the AND circuit 192 in the character $\bar{0}$ gate 190 and now effectively block the positive pulse on the match sample line 53 from passing through to signal a write error. However, if the characters do not match, then, one or more of the triggers 184 of the character match register 180 is turned on when the hi level character is stored therein and a positive signal is applied from its right hand output or outputs via the OR circuit 186 to condition the AND circuit 192 in the character $\bar{0}$ gate 190 so that when a pulse appears on match sample line 53, it passes via the conditioned AND circuit 192 to the match error line 194. The positive pulse on the match error line 194 is applied to the error indicator 230 where it passes via the OR circuit 232 to turn on the R/W check trigger 234 which, in being turned on, applies a positive signal to the R/W error line 236 to signal a write error.

The negative shift of potential on the character gate line 118 is also applied to the negative reset inputs of the triggers 82 of the hi register 80 and the triggers 102 of the lo register 100 causing them to be reset in preparation for receiving the next character of the record.

A similar procedure is performed for each character recorded on the magnetic tape and it should be apparent that with the dual-channel sensing arrangement of the present invention both channels are verified and if no error is detected it insures a reliable recording free of pickup or dropout within the limits set.

Lastly, it will be remembered, as explained hereinbefore, that after the last character of a record has been recorded on the magnetic tape, a HRC character is recorded so that an even number of 1 bits is recorded in each of the seven tracks of the tape. Also, it should be noted that the lo level version of each character of the record reproduced from the tape is, at the proper time, transferred to the HRC register 210 where an even count or horizontal check is made to insure that there are an even number of 1 bits recorded in a horizontal direction of each track. Thus, each 1 bit signal that is applied to the triggers 214 of the HRC register 210 cause the triggers to switch from their present state to their opposite state and if an even number of 1 bit signals are applied thereto, the triggers 214 of the HRC register 210 will all be in the off state after the HRC character is applied thereto causing negative signals to be applied from their right hand outputs via the OR circuit 216 to decondition the AND circuit 224 in the HRCR $\bar{0}$ gate 220. However, if an odd count is made by one or more of the triggers 214 of the HRC register 210, then, that trigger or triggers will be on causing a positive signal or signals to be applied from their right hand output or outputs via the OR circuit 216 to condition the AND circuit 224 in the HRCR $\bar{0}$ gate 220. At the end of the recording operation, a positive pulse is applied via the HRCR sample line 222 to the AND circuit 224 of the HRCR $\bar{0}$ gate 220. If the AND circuit 224 is conditioned, due to the detection of a horizontal check error, the positive pulse on the HRCR sample line 222 passes therethrough to the HC error line 226. The positive pulse on the HC error line 226 is applied to the error indicator 230 where it passes via the OR circuit 232 to turn on the R/W check trigger 234 which, in being turned on, applies a positive signal from its right hand output to the R/W error line 236 to signal a write error. Furthermore, if an error is detected, a neon tube associated with the trigger or triggers 214 in the HRC register 210 would be lit to indicate in which track the error occurred.

To summarize, during the write reliability checking operation, three types of errors may be detected, namely, a write vertical check error, a horizontal check error and a match error.

Figure 5C:
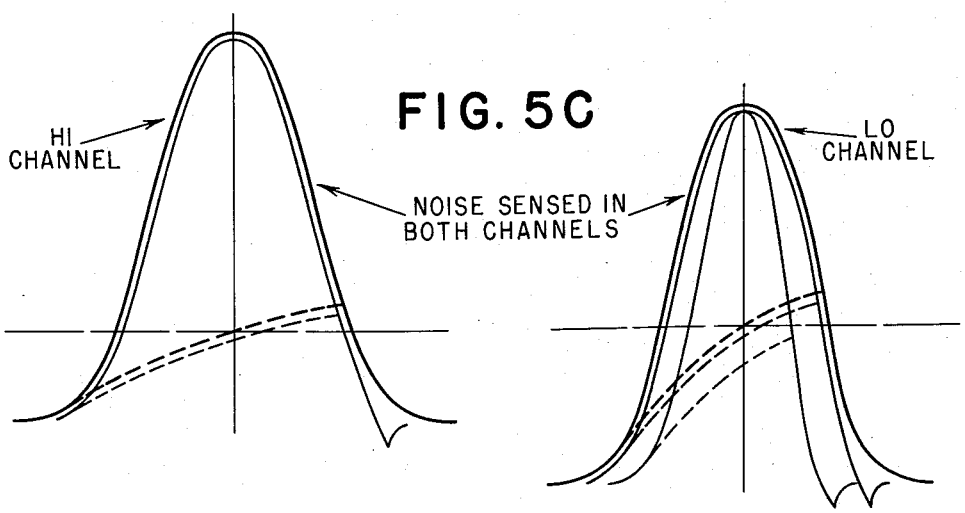
FIG. 5C shows a noise pulse superimposed on a normal pulse in both the high channel and the low channel and being of such magnitude and width as to be sensed in both channels.

It will be remembered that a write vertical check is made at both the skew sample time and the late sample time for each character recorded on tape. Consequently, if a vertical check error is detected at skew sample time, it indicates that either an odd noise bit or bits were picked up in a character, though this is not likely to occur in view of the noise discrimination which occurs in the lo channel, as shown in FIG. 5, or that an odd bit or bits dropped out of the character due to tape shim, or that the tape skew was excessive causing an odd number of bits to be detected by skew sample time. If a vertical check error is detected at late sample time, it indicates that either an odd noise bit or bits were picked up during the interval from skew sample time to late sample time, or that, due to excessive tape skew, two valid bits occurred after skew sample time but that one of them dropped out, due to tape shim, or that, due to excessive tape skew, an odd bit or bits were sensed after skew sample time.

It will be remembered that a horizontal check is made of each record recorded on tape. Consequently, if a horizontal check error is detected at the end of the write operation it identifies the track in which an odd bit or bits were picked up or dropped out of. Also, note, that if a horizontal check error is detected at the end of the write operation but no vertical check error was detected, then, it indicates that an even number of bits were either picked up or dropped out of a character.

It will also be remembered that a match check is made of each character recorded on the tape, that is, the lo level version of a character is matched with the hi level version of the character. Consequently, if a match error is detected, it indicates that pickup or dropout occurred in one channel, generally the hi channel, but not the other channel or that there was excessive tape skew causing an even number of 1 bits to be sensed before and after skew sample time.

*Read Reliability Checking*

A read reliability checking operation will now be described in detail and reference may be made to the overall block diagram of FIG. 3 as well as to the detailed logical block diagrams shown in FIGS. 8 to 12, inclusive. Also, reference may be made to the timing diagram of FIG. 13 to aid in understanding the sequence of events in the present operation.

Referring first to FIG. 12, a negative reset pulse is applied to reset the binary triggers 214 of the HRC register 210, in preparation for making a horizontal check, and to reset the R/W check trigger 234 in the error indicator 230, in preparation for signalling a read error if and when such is detected. Also, switch 240 is momentarily closed to reset the read transfer/test VC check trigger 238 in preparation for signalling a read transfer error if and when such is detected.

Referring now to FIG. 8, switch 11 of the function control unit 10 is maintained set at position A for a normal operation. Consequently, a positive signal is maintained on the normal line 13 and the test hi line 15. As before, the positive signal on the normal line 13 is applied to the inverter 16 where it is inverted to a negative signal and applied to the test line 17 which is maintained negative during this entire operation. The positive signal on the normal line 13 is also applied to condition the AND circuits 18 and 19. The positive signal on the test hi line 15 is applied to the inverter 20 where it is inverted to a negative signal and applied to maintain the test hi line negative during this entire operation.

Now, as soon as the read operation is called for, that is, information is to be transferred from the magnetic tape to a computer, the tape unit is signalled to initiate movement of the magnetic tape and a positive signal is applied to and maintained on the read line 4 and the R/W gate line 61 during the entire read operation. The positive signal on the read line 4 is applied to condition the AND circuits 202 in the character register gate 200 in FIG. 12 and also passes via the now conditioned AND circuit 19 in FIG. 9 to the normal read line 22. The positive signal on the normal read line 22 is applied as one input to each of the AND circuits 162 of the hi register read gate 160 in FIG. 11 and to condition the AND circuit 154 in the read/test VRC gate 150. Clock pulses are continuously applied to the sample generator 30, which, however, does not respond thereto until such time as a character gate signal is received as it will be for each character reproduced from the tape.

Referring now to the lo sensing unit 70A and the hi sensing unit 70B in FIG. 8, the AND circuits 72A in the lo sensing unit 70A are conditioned by the positive signals on the test hi line 15 and the R/W gate line 61 while the AND circuits 72B in the hi sensing unit 70B are conditioned by the positive signal on the R/W gate line 61.

At the proper time, a record consisting of a variable number of characters of information are reproduced, character-by-character, at the read portion of the magnetic heads 6. As soon as the first character of information passes above the reproducing section of the magnetic heads 6, the 1 bits of the character are sensed and applied via the read bus 8 to the read amplifier 60 where they are amplified and rectified and for each 1 bit signal sensed two positive output signals are produced which vary about the lo sensitivity level and the hi sensitivity level, respectively. The lo level 1 bit pulses are applied via bus 69A to the now conditioned AND circuits 72A in the lo sensing unit 70A while the hi level 1 bit pulses are applied via bus 69B to the AND circuits 72B in the hi sensing unit 70B. The respective positive 1 bit pulses pass via the now conditioned AND circuits 72A and 72B, respectively, are integrated by the integrating circuits 74A and 74B, respectively, and then applied to switch corresponding ones of the triggers 76A and 76B. Assuming no dropout, when the leading edge of the 1 bit pulses reach the threshold level of the triggers 76, these triggers are switched on and when the trailing edge of the 1 bit pulses fall below the threshold level these triggers are switched back off.

Referring now to FIGS. 8 to 10, those of the triggers 76 in the sensing unit 70 which are switched back off apply a negative shift of potential via bus 78A and 78B to corresponding ones of the triggers 102 in the lo register 100 and to corresponding ones of the triggers 82 in the hi register 80, respectively, causing these triggers to be turned on so that the lo level version of the first character is stored in the lo register 100 and the hi level version of the first character is stored in the hi register 80. Those triggers 102 of the lo register 100 which are turned on cause positive signals to be applied from their right hand outputs to corresponding lines of the lo channel 104 and negative signals to be applied from their left hand outputs to corresponding lines of the lo channel 105, while those triggers 82 of the hi register 80 which are turned on cause positive signals to be applied from their right hand outputs to corresponding lines of the hi channel 84.

As soon as the first 1 bit of the first character is stored in one of the triggers 102 of the lo register 100, a positive signal is applied from the right hand output of that trigger to the character gate unit 110 in FIG. 11, where it passes via the OR circuit 112 to the inverter 114 and is inverted to a negative signal and is applied via a negative shift input to turn on the character gate trigger 116 which, in being turned on, applies a positive shift of potential to the character gate line 118.

Referring now to the sample generator 30 in FIG. 9, the positive shift of potential on the character gate line 118 is applied to condition the AND circuit 36. At T5 time, a positive clock pulse is applied to the T5 line 34, which passes via the now conditioned AND circuit 36 to condition the AND circuits 37, 43, 48 and 55. At the same time, namely, T5 time, a positive clock pulse is applied to the T1 line 54, which passes via the now conditioned AND circuit 55 causing a positive shift of potential to be applied on the character register reset line 56 having no effect on the negative shift reset inputs of the triggers 184 in FIG. 12. However, following this, at T6, time, the negative trailing edge of the positive clock pulse on the T1 line 54 deconditions the AND circuit 55 causing a negative shift of potential to be applied via the character register reset line 56 to reset all of the triggers 184 of the character match register 180 in preparation for receiving the lo level version of the first character.

Also, at T6 time, a positive clock pulse is applied to the T1 line 54, which passes via the now conditioned AND circuit 37 to the AND circuit 38 which is presently blocked by the negative signal on the normal write line 23 due to the fact that a read operation is being performed. Consequently, the positive pulse does not pass to the skew sample line 41 to make an early sample of the lo level version of the first character stored in the lo register 100. Further, at T7 time, the negative trailing edge of the positive clock pulse on the T2 line is applied to the peaker 42 which produces a positive pulse in response thereto which passes via the now conditioned AND circuit 43 to the AND circuit 44 which is also presently blocked by the negative signal on the normal write line 23. Consequently, the positive pulse does not pass to the intermediate sample line 47 to cause the hi level version of the first character stored in the hi register 80 to be effectively gated to the character match register 180.

Meanwhile, the first character is completely stored in the hi register 80 and the lo register 100 and a combination of signals, corresponding to the lo level version of the first character, is applied via the lo channel 105 to the VRC unit 120 which functions to produce a positive signal to condition the AND circuit 134 of the VRC gate 130 in FIG. 11 if an invalid character is sensed, due to dropout, consisting of an odd number of 1 bits, or produce a negative signal to decondition the AND circuit 134 of the VRC gate 130 if a valid character is sensed consisting of an even number of 1 bits.

Referring now to the sample generator 30 in FIG. 9, at T8 time, a positive clock pulse is applied to the T4 line 33 which passes via the now conditioned AND circuit 48 to the late sample line 49. The positive pulse on the late sample line 49 passes via the OR circuit 132 in the VRC gate 130 and is applied to the AND circuit 134. If the VRC unit 120 detects no error, then, as previously explained, a negative signal is applied to decondition the AND circuit 134 and block the positive pulse on the late sample line 49 from passing therethrough to the VRC line 136 to initiate an error signal. However, if an error is detected by the VRC unit 120, then, as previously explained, a positive signal is applied to condition the AND circuit 134 so that when the positive pulse is applied to the late sample line 49 it passes therethrough to the VRC line 136.

Let it be assumed that a valid character is sensed by the VRC unit 120 so that the positive pulse on the late sample line is blocked from passing to the VRC line 136. Consequently, referring to the sample generator 30 in FIG. 9 and the character gate unit 110 in FIG. 11, at T9 time, a negative reset pulse is applied to turn off the trigger 116 in the character gate unit 110 which, in being turned off, applies a negative shift of potential from its right hand output to the character gate line 118. The negative shift of potential on the character gate line 118 is applied, in FIG. 10, to reset the triggers 102 of the lo register 100 and the triggers 82 in the hi register 80 in preparation for receiving the next character of the record. Those of the triggers 102 of the lo register 100 which are turned off, corresponding to the 1 bits of the first character stored therein, apply a negative shift of potential from their right hand outputs via the lo channel 104 to the character match register 180 and the HRC register 210. In the HRC register 210, the negative shifts of potential on the lo channel 104 pass via corresponding OR circuits 212 to turn on corresponding ones of the triggers 214 to initiate the odd-even count or horizontal check. In the character match register 180, the negative shifts of potential on the lo channel 104 pass via corresponding OR circuits 182 to turn on corresponding ones of the triggers 184. Thus, the lo level version of the first character is effectively stored in both the character match register 180 and the HRC register 210. It will be remembered that when the read operation was called for, a positive signal was applied to and maintained on the read line 4 to condition the AND circuits 202 in the character register gate 200 so that as soon as the lo version of the first character is stored in the character match register 180, positive signals, corresponding to the 1 bits of the first character, are appllied from the right hand outputs of the triggers 184 via the now conditioned AND circuit 202 of the character register gate 190 to the bus 204 where the lo level version of the first character is transferred to the computer.

Therefore, it should be apparent, that if no vertical redundancy check error is detected by the VRC unit 120, the lo level version of a character reproduced from the tape, free of pickup and dropout, is transferred to the computer. The fact that the lo level version of the character reproduced from the tape is transferred to the computer has an advantage not heretfore obtained, in that, noise, which appeared in the interrecord gap areas, previously triggered false read operations but, now since the lo level character initiates the character gate and since the lo sensing unit 70A discriminates against noise, then, any noise which is picked up in the interrecord gap area is not sensed in the lo sensing unit 70A with the consequent effect being that false read operations are not initiated.

Now, going back for a moment, let it be assumed that the first character of information reproduced from the tape is presently stored in both the lo register 100 and the hi register 80 and that the VRC unit 120 detects an error due to a bit or bits dropout causing a positive signal to be applied to condition the AND circuit 134 in the VRC gate 130. Consequently, when the sample generator 30 generates the positive pulse on the late sample line 49, it now passes via the OR circuit 132 of the VRC gate 130 and via the now conditioned AND circuit 134 to the VRC line 136. The positive pulse on the VRC line 136 is applied via the conditioned AND circuit 154 in the read/test VRC gate 150 to the read/test VC error line 156 where it is applied to turn on the error trigger 238 in the error indicator 230 which, in being turned on, applies a positive signal to the read transfer/test VC line 242 to signal a read transfer error. The positive pulse on the VRC line 136 is applied, in conjunction with the positive signal on the normal read line 22 and the positive signals on various lines of the hi channel 84, corresponding to the 1 bits of the first character stored in the hi register 80, to positively condition corresponding ones of the AND circuits 162 in the hi register read gate 160. Then, at T9 time, the negative trailing edge of the positive pulse on the VRC line 136 is applied to decondition those of the AND circuits 162 which were previously positively conditioned causing negative shifts of potential to be applied via corresponding lines of the bus 164 to the character match register 180 and the HRC register 210. In the HRC register 210, the negative shifts of potential on the various lines of the bus 164 pass via corresponding OR circuit 212 to turn on corresponding ones of the triggers 214 to initiate, as before, the horizontal check. In the character match register 180, the negative shifts of potential on the various lines of the bus 164 pass via corresponding OR circuits 182 to turn on corresponding ones of the triggers 184. Thus, the hi level version of the first character, which includes those bit or bits which dropped out of the lo level version of the first character, is stored in both the character match register 180 and the HRC register 210. Now, since the AND circuits 202 of the character register gate 200 are conditioned, then, as soon as the hi level version of the first character is stored in the character match register 180, positive signals, corresponding to the 1 bits of the first character, are applied from the right hand outputs of the triggers 184 via the now conditioned AND circuits 202 to the bus 204 where the hi level version of the first character is transferred to the computer. At the same time, namely, at T9 time, the trigger 116 in the character gate unit 110 is turned off causing a negative shift of potential to be applied to the character gate line 118 which is applied to reset the hi register 80 and the lo register 100 in preparation for receiving the next character reproduced from the tape.

A similar procedure is performed for each character reproduced from the magnetic tape and, it should be apparent, that the lo level version of each character reproduced from the tape is normally gated to the computer but if a VRC error is detected in the lo channel, due to bit or bits dropout, a switching operation is performed causing the hi level version of the character, which includes the bit or bits dropped out of the lo level version, to be transferred to the computer. An additional vertical redundancy check may be made of each character as it reaches the computer. Further, it should be apparent that when the device begins to have constant resort to the hi channel for correct information, which may signify a defective unit, this condition is indicated by the read transfer error signal produced by the error indicator 230.

Also, it should be noted that each character reproduced from the magnetic tape is transferred to the HRC register 210 where an even count or horizontal check is made to insure that there is an even number of 1 bits reproduced in an horizontal direction of each track. Thus, each 1 bit pulse is applied to the triggers 214 of the HRC register 210 cause the triggers to be switched from their present state to the opposite state and if an even number of 1 bit pulses are applied thereto, the triggers 214 will all be in the off state after the HRC character is applied thereto causing negative signals to be applied from their right hand outputs via the OR circuits 216 to decondition the AND circuit 224 in the HRCR 0̄ gate 220. However, if an odd count is made by one or more of the triggers 214 of the HRC register 210, then, that trigger or triggers will be on causing a positive signal or signals to be applied from their right hand output or outputs via the OR circuit 216 to condition the AND circuit 224 in the HRCR 0̄ gate 220. At the end of the read operation, a positive pulse is applied via the HRCR sample 222 to the AND circuit 224 of the HRCR 0̄ gate 220. If the AND circuit 224 is conditioned, due to the detection of a horizontal check error, the positive pulse on the HRCR sample line 222 passes therethrough to the HC error line 226. The positive pulse on the HC error line 226 is applied to the error indicator 230 where it passes via the OR circuit 232 to turn on the R/W check trigger 234 which, in being turned on, applies a positive signal from its right hand output to the R/W error line 236 to signal a read error. Furthermore, if an error is detected, a neon tube associated with the trigger or triggers 214 in the HRC register 210 would be lit to indicate in which track the error occurred.

*Testing*

Provision is made for testing the lo level version of information and the hi level version of information independently of each other or both together. Consequently, a test lo operation will first be described followed by a test hi operation and then a test both operation. Reference may be made to the overall block diagram of FIG. 3 as well as the detailed logical block diagrams of FIGS. 8 to 12 inclusive.

Referring to the function control unit 10 in FIGS. 8 and 9, since a test lo operation is to be performed, the function switch 11 is moved to position B and the upper arm of the switch no longer being connected to position A prevents the + source of potential from being applied to the normal line 13. Consequently, a − source of potential is applied via resistor 12 to the normal line 13. This negative signal on the normal line 13 is applied to decondition the AND circuit 18 and prevent the positive signal applied to the write line 2, when a write operation is called for, from passing to the normal write line 23. The negative signal on the normal line 13 is also applied to decondition the AND circuit 19 and prevent the positive signal applied to the read line 4, when a read operation is called for, from passing to the normal read line 22. Consequently, the normal write line 23 and the normal read line 22 are maintained negative during the entire test lo operation. The negative signal on the normal line 13 is additionally applied to the inverter 16 where it is inverted to a positive signal and applied to the test line 17. The positive signal on the test line 17 is applied to one input of the AND circuit 39, in the sample generator 30, to permit a positive pulse to pass to the skew sample line 41; and on to the OR circuit 152, in the read/test VRC gate 150, in FIG. 11, to condition the AND circuit 154 to permit a positive pulse to pass to the read/test VC error line 156 when a test VC error is detected; and to condition the AND circuit 246, in the error indicator 230, in FIG. 12, to permit a positive pulse to pass to the stop tape line 248 whenever a test error is detected.

The lower arm of the function switch 11, at position B, functions in the same manner as in position A, namely, to apply a + source of potential to the test hi line 15 to condition the AND circuits 72A in the lo sensing unit 70A. The positive signal on the test hi line 15 is also applied to the inverter 20 where it is inverted to a negative signal and applied via the test hi line 21 to decondition the register gate 90 in FIG. 10 to prevent the transfer of the hi level version of information from the hi register 80 to the lo register 100 during this operation. Also, a − source of potential is applied via resistor 26 to maintain a negative signal on the test both line 27 during this entire operation.

The negative signals on the test both line 27 and the normal write line 23 are applied to decondition the AND circuits 44 and 45, respectively, to block the passage of a positive pulse to the intermediate sample line 47 which, therefore, is maintained negative during this entire operation. The negative condition of the intermediate sample line 47 is applied to decondition the AND circuits 172, in the hi register write gate 170, in FIG. 11, to block the transfer of the hi level version of information from the hi register 80 to the character match register 180 during a write operation. Also, the negative signal on the normal read line 22 is applied to decondition the AND circuits 162, in the hi register read gate 160, in FIG. 11, to block the transfer of the hi level version of information from the hi register 80 to the character match register 180 during a read operation. The negative signals on the test both line 27 and the normal write line 23 are also both applied via the OR circuit 50 to decondition the AND circuit 51 to block the passage of a positive pulse to the match sample line 53. It should be apparent that since only the lo level version of information is being tested, no match check is made in the character match register 180 and consequently, no positive match sample pulse is necessary during this operation.

Provision is also made for testing for excessive tape skew during a write operation by moving the contact arm of switch 24 in the function control unit 10, in FIG. 8, to the skew test position causing a + source of potential to be applied to the skew test line 26. The positive signal on the skew test line 26 is applied via the OR circuit 31, in the sample generator 30, and in combination with the positive signal on the test line 17, to condition the AND circuit 39 to permit a positive pulse to pass to the skew sample line 41.

Now, the dual-channel sensing device is prepared to proceed with the test lo operation which for write reliability checking consists of an excessive tape skew check, a vertical redundancy check and a horizontal redundancy check and, for read reliability checking, consists of an excessive skew check, a vertical redundancy check and horizontal redundancy check.

Referring first to FIG. 12, a negative reset pulse is applied to reset the triggers 214, in the HRC register 210, in preparation for making a horizontal check and to reset the R/W check trigger 234, in the error indicator 230, in preparation for signalling a read/write error if and when such is detected. Also, switch 240, in the error indicator 230, is closed momentarily to reset the check trigger 238 in preparation for signalling a test VC error if and when such is detected.

If a write reliability check is now to be made, then, a write operation is called for and the tape unit is signalled to initiate movement of the magnetic tape and a positive signal is applied to and maintained on the write line 2 and the R/W gate line 61 during the entire write operation. The positive signal on the write line 2 is applied to condition the AND circuit 141, in the write VRC gate 140, in FIG. 12, to permit passage of a positive pulse to the write VC error line 142 if and when a vertical redundancy error is detected.

At the proper time, a record, consisting of a variable number of characters of information, is transmitted, character-by-character, to the write portion of the magnetic heads 6 causing the record to be recorded on the magnetic tape. As the record passes above the reproducing section of the magnetic heads 6, the characters of the record are sensed and applied via the read bus 8 to the read amplifier 60 where they are amplified and rectified and a lo level version is applied via the lo sensing unit 70A to the lo register 100 and a hi level version is applied via the hi sensing unit 70B to the hi register 80.

If a read reliability check is to be made, then, a read operation is called for and the tape unit is signalled to initiate movement of the tape. Also, at the proper time, a record passes above the reproducing section of the magnetic heads 6 and is sensed and applied via the read bus 8 to the read amplifier 60 where it is amplified and rectified and the lo level version is passed via the lo sensing unit 70A to the lo register 100 and the hi level version is passed via the hi sensing unit 70B to the hi register 80.

A vertical redundancy check is made of the information stored in the lo register 100 by the VRC unit 120 and if an error is detected a positive signal is applied to condition the AND circuit 134 in the VRC gate 130. If a write reliability check is being made, then, a skew sample is made of the VRC gate 130 to check for excessive tape skew and if excessive tape skew is detected, then, the positive pulse on the skew sample line 41 passes via the conditioned write VRC gate 140 to the error indicator 230 where the error trigger 234 is turned on producing a positive signal on the R/W error line 236 to signal a write error. The positive signal on the R/W error line 236 is also applied via the OR circuit 244 and the now conditioned AND circuit 246 to the test stop line 248 to signal the tape unit to stop the tape.

A late sample is made during both a write reliability check and read reliability check to check for the detection of pickup or dropout in the lo level version of each character reproduced from the tape. If a vertical redundancy check error is detected during a write reliability check, a positive pulse is applied via the write VRC gate 140 to the error indicating 230 where the error trigger 234 is turned on producing a positive signal on the R/W error line 236 to signal a write error. The positive signal on the R/W error line 236 is also applied via the OR circuit 244 and the now conditioned AND circuit 246 to the test stop line 248 to signal the test unit to stop the tape. If a vertical redundancy check error is detected during a read reliability check, then, a positive signal is applied via the read/test VRC gate 150 to turn on the error trigger 238, in the error indicator 230 which, in being turned on, applies a positive signal to the read transfer/test VC error line 242 to signal a test vertical check error. The positive signal on the line 242 is also applied via the OR circuit 244 and the now conditioned AND circuit 246 to the test stop line 248 to signal the tape unit to stop the tape.

At the end of each character gate period, the lo level version of each character stored in the lo register 100 is gated to the HRC register 210 to cause a horizontal check to be made of the record being reproduced from the tape. At the end of either a write reliability check or read reliability check, if any of the triggers 214 of the HRC register 210 remain on, a positive signal or signals are applied via the OR circuit 216 to condition the AND circuit 224 of the HRCR 0̄ gate 220 so that when a positive pulse is applied to the HRCR sample line 222 it passes to the error indicator 232 where it turns on the error trigger 234 producing a positive signal on the R/W error line 236 to signal a read/write error. The positive signal on the R/W error line 236 is also applied via the OR circuit 244 and the conditioned AND circuit 246 to the test stop line 248 to signal the test unit to stop the tape.

Thus, it should be apparent that in a test lo operation a write reliability check may be made consisting of an excessive tape skew check, a vertical redundancy check and a horizontal redundancy check. Likewise, a read reliability check may be made consisting of a vertical and horizontal redundancy check, and, if desired, an excessive skew check. The latter is controlled by skew test switch 24.

A test hi operation is essentially identical to a test lo operation except that a check is made of the high level version of information rather than the lo level version.

Referring to the function control unit 10 in FIGS. 8 and 9, the function switch 11 is moved to position C. The upper arm of switch 11 in being moved to position C blocks, as at position B, the + source of potential from being applied to the normal line 13 with the consequent effect being that a negative signal is maintained on the normal line 13 while via inverter 16 a positive signal is maintained on the test line. The lower arm of switch 11 in being moved to position C blocks the + source of potential from being applied to the test hi line 15. Consequently, a — source of potential is applied via resistor 14 to maintain a negative signal on the test hi line 15 during this entire operation. The negative signal now on the test hi line 15 is applied to decondition the AND circuits 72A of the low sensing unit 70A to effectively block the lo version of information from passing through to the lo register 100. The negative signal on the test hi line 15 is also applied to the inverter 20 where it is inverted to a positive signal and applied via the test hi line 21 to condition the diode gates 92 of the register gate 90 so that when the hi level version of information is stored in the hi register 80, the output thereof is gated via the register gate 90 to the lo register 100 where it is stored and vertically checked by the VRC unit 120. From this point on, a similar procedure is followed as that described in the test lo operation. Consequently, a write reliability check may be made of the high level version of information independently of the lo level version consisting of an excessive tape skew check, a vertical redundancy check and a horizontal redundancy check. Likewise, a read reliability check may be made of the hi level version of information independently of the lo level version consisting of a vertical and horizontal redundancy check and an excessive skew check. If a vertical redundancy check error is detected during write reliability checking or if a horizontal redundancy check error is detected during either write or read reliability checking, then, the error trigger 234, in the error indicator 230, is turned on causing a positive signal to be applied to the R/W error line 236 to signal either a write or read error, as the case may be. Also, if a vertical redundancy check error is detected during either write or read reliability checking, then, the error trigger 238 is turned on causing a positive signal to be applied to the read transfer/test VC error line 242 to signal a test VC error. Furthermore, if, during the testing operation, either or both of the error triggers are turned on, then, a positive signal is passed to the test stop line 248 to signal the tape unit to stop the tape.

A test both operation is a test operation which permits checking information at both a hi and lo level of sensitivity and is useful for testing with marginal service voltages.

Referring to the function control unit 10 in FIGS. 8 and 9, the function switch 11 is moved to position D for a test both operation and, as in the previous test operations, a negative signal is applied to the normal line 13 with the consequent effect being that the normal write line 23 and the normal read line 22 are maintained negative during the entire operation. The negative signal on the normal line 13 is also inverted by the inverter 16 to a positive signal and applied to the test line 17. The positive signal on the test line 17 is applied to one input of the AND circuit 39, in the sample generator 30; via the OR circuit 152, in the read/test VRC gate 150, in FIG. 11, to condition the AND circuit 154 to permit a positive pulse to pass to the read/test VC error line 156 when a test VC error is detected; and to condition the AND circuit 246, in the error indicator 230, in FIG. 12 to permit a pulse to pass to the stop tape line 248 whenever a test error is detected.

The upper arm of the function switch 11, in position D, permits the + source of potential to be applied to the test both line 27. The positive signal on the test both line 27 is applied via the OR circuit 31, in the sample generator 30, and in conjunction with the positive signal on the test line 17, conditions the AND circuit 39 to pass a positive pulse to the skew sample line 41; via the OR circuit 50 to condition the AND circuit 51 to permit a positive pulse to pass to the match sample line 53; and to condition the AND circuit 45 to permit a positive pulse to pass to the intermediate sample line.

The lower arm of the function switch 11, in position D, functions in the same manner as in positions A and B, namely, to apply a + source of potential to the test hi line 15 to condition the lo sensing unit 70A to respond to the lo level version of information. The positive signal on the test hi line 15 is also applied to the inverter 20 where it is inverted to a negative signal and applied via the test hi line 21 to decondition the register gate 90, in FIG. 10, to prevent the transfer of the hi level version of information from the hi register 80 to the lo register 100.

Following this, a similar reliability checking operation may be performed as that described for the normal operation in the preceding sections except that if an error is detected the tape unit will be signalled to stop the tape and an error correction procedure may then be followed.

Thus, for reliability checking in the test both operation, an excessive tape skew check is made, a vertical and horizontal redundancy check is made of the lo level version of information and a character match check is made between the lo level version and hi level version of information and if no errors are detected it indicates a highly reliable recording and properly functioning circuitry, whereas, if a R/W error or test VC error is detected the tape unit is signalled to stop the tape.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Apparatus for checking information stored in a multi-track storage medium comprising means to read a single version of the information out of a single track of said storage medium, means responsive to said read out means for simultaneously producing a first and second version of the single version of information read out of said storage medium, a first information channel, a second information channel, means for transmitting the first version of the information through said first information channel, means for transmitting said second version of the information through said second information channel, a comparison means, means for transferring the first version of the information from said first information channel to said comparison means, means for transferring the second version of the information from said second information channel to said comparison means, and means operative under control of said comparison means for producing an indication if a difference is detected between the first and second version of the single version of the information read out of said storage medium.

2. Apparatus for checking information stored in a storage medium comprising means for extracting the information from said storage medium, means responsive to said extracting means for simultaneously producing a first and second signal version of the information extracted from said storage medium, a first sensing unit for sensing the first signal version of the information including means to prevent noise signals from being sensed by said first sensing unit, a second sensing unit for sensing the second signal version of the information including means to permit weak signals to be sensed by said second sensing unit, a comparison means, means for transferring the first signal version of the information sensed by said first sensing unit to said comparison means, means for transferring the second signal version of the information sensed by said second sensing unit to said comparison means, and means operative under control of said comparison means for producing an indication if a difference is detected between the first and second signal version of the information.

3. Apparatus for checking information comprising a control device having a storing means and a reading means so arranged as to permit information to be stored in and the same information to be concurrently read from a storage medium, means responsive to said reading means for simultaneously producing a first and second signal version of the information being stored in said storage medium, a first sensing unit for sensing the first signal version of the information including means to prevent noise signals from being sensed by said first sensing unit, a second sensing unit for sensing the second signal version of the information including means to permit weak signals to be sensed by said second sensing unit, a comparison means, means for transferring the first signal version of the information sensed by said first sensing unit to said comparison means, means for transferring the second signal version of the information sensed by said second sensing unit to said comparison means, and means coupled to said comparison means for producing an indication of the correctness of the information stored in said storage medium.

4. Apparatus for checking information being transferred from a first storage medium to a second storage medium comprising means to read the information out of said first storage medium, means responsive to said read out means for simultaneously producing a first and second version of the information read out of said first storage medium, a first information channel, a second information channel, means for transmitting the first version of information through said first information channel, means for transmitting said second version of the information through said second information channel, means associated with said first information channel for checking the correctness of the first version of the information, means for transferring the first version of the information from said first information channel to said second storage means and means operatively controlled by said checking means for transferring the second version of the information from said second information channel to said second storage medium if an error is detected in the first version of the information.

5. Apparatus for checking a plurality of multi-element characters recorded on a record medium wherein each element is represented by a first or second signal, the first signal being indicative of the presence of a weighted value and the second signal being indicative of the absence of the weighted value comprising means for sequentially extracting the plurality of characters from said record medium, means responsive to said extracting means for simultaneously producing a first and second version of each character sequentially extracted from said record medium, a vertical check unit for sensing the first version of each character to detect when the number of first signals which are present in any character bears a predetermined relation to the number of second signals which are present in any character, a match unit, a horizontal check unit having a plurality of devices each corresponding to an element of the multi-element characters, means for transferring the first version of the plurality of characters sequentially to said match unit and to the devices of said horizontal check unit each of which assumes a first condtion if an even number of first signals is received and assumes a second condition if an odd number of first signals is received, means to detect if any of the devices of said horizontal check unit are in a predetermined one of the conditions at the end of the transfer, means for transferring the second version of the plurality of characters sequentially to said match unit so that the first and second version of each character is matched element for element, means responsive to said match unit to detect a difference between the first and second version of each character, and means responsive to said detecting means to provide an indication of the correctness of the plurality of characters recorded on said record medium.

6. Apparatus for checking a plurality of multi-element characters being transferred from a first storage medium to a second storage medium wherein each element is represented by a first or second signal, the first signal being indicative of the presence of a weighted value and the second signal being indicative of the absence of the weighted value comprising means for sequentially extracting the plurality of characters from said first storage medium, means responsive to said extracting means for simultaneously producing a first and second version of each character sequentially extracted from said first storage medium, a vertical check unit for sensing the first version of each character to detect when the number of first signals which are present in any character bears a predetermined relation to the number of second signals which are present in any character, a horizontal check unit having a plurality of devices each corresponding to an element of the multi-element characters, means for transferring the first version of the plurality of characters sequentially to said second storage medium and to the devices of said horizontal check unit each of which assumes a first condition if an even number of first signals is received and assumes a second condition if an odd number of first signals is received, means to detect if any of the devices of said horizontal check unit are in a predetermined one of the conditions at the end of the transfer, means operatively controlled by said vertical check unit for transferring the second version of a character to said second storage unit and said horizontal check unit whenever the predetermined relation is detected by said vertical check unit, and means responsive to said vertical and horizontal check units to provide an indication of the correctness of the plurality of characters transferred from said first storage medium to said second storage medium.

7. In combination with a record driving means for driving a record medium, apparatus for checking information recorded on said record medium comprising means for reproducing the information from said record medium, means responsive to said reproducing means for simultaneously producing a first and second version of the information recorded on said record medium, a checking means, means for selectively causing a predetermined one of said versions of the information to be transferred to said checking means to check the information for errors, means associated with said checking means for producing an indication if an error is detected in the information recorded on said record medium and means responsive to said error indication to signal said record driving means to stop driving said record medium.

8. In combination with a record driving means for driving a record medium apparatus for checking information recorded on said record medium comprising means for reproducing the information from said record medium, means responsive to said reproducing means for simultaneously producing a first and second version of the information recorded on said record medium, a checking means, a comparison means, switching means having a first, second and third position, said switching means when in the first position being effective to permit the first version of the information to be transferred to said checking means to check the correctness of the first version of the information, said switching means when in the second position being effective to permit the second version of the information to be transferred to said checking means to check the correctness of the second version of the information, said switching means when in the third position being effective to permit the first and second version of the information to be transferred to said comparison means to compare the first and second version of the information recorded on said record medium, means associated with said checking means and said comparison means for producing an indication if an error is detected in the information recorded on said record medium and means responsive to said error indication to signal said record driving means to stop driving said record medium.

9. Apparatus for checking multi-element characters recorded on a record medium wherein each element is represented by a first or second signal, the first signal being indicative of the presence of a weighted value and the second signal being indicative of the absence of the weighted value comprising means for sequentially extracting the characters from said record medium, a storage medium having a plurality of devices each of which corresponds to an element of the multi-element characters and has a first and second condition, means responsive to said extracting means for transferring the first and second signals of each character to the devices of said storage medium, the devices of said storage medium to which the first signals are applied assuming the first condition and the devices to which the second signals are applied assuming the second condition, first sensing means associated with said storage medium for sensing when the first device of said storage medium assumes the first condition, means responsive to said first sensing mean sensing the first device of said storage medium assuming the first condition, for producing a character gate signal having a predetermined period during which all of the signals of a character are received by the devices of said storage medium, second sensing means for sensing the condition of the devices of said storage medium during the predetermined period to produce a conditioning signal whenever the number of first signals which are received by the devices of said storage medium bears a predetermined relation to the number of second signals which are received by said devices, means responsive to the character gate signal for producing a first control signal at a predetermined time prior to the end of the predetermined period, means responsive to the character gate signal for producing a second control signal at the end of the predetermined period, and means conditioned by said conditioning signal and rendered effective first by said first control signal to provide an indication of the correctness of a character at the predetermined time prior to the end of the predetermined period and second by said second control signal to provide an indication of the correctness of the character at the end of the predetermined period.

10. A device for checking information stored in a storage medium comprising means associated with said storage medium for producing signals corresponding to the information stored therein, a first and second sensing unit each having a threshold level at which it responds to an input signal to produce an output signal, means responsive to said information signal producing means for simultaneously producing signals corresponding to a first and second version of the information stored in said storage medium, the signals corresponding to the first version of the information varying about a relatively low level with respect to the threshold level of said sensing units while the signals corresponding to the second version of the information varying about a relatively high level with respect to the low level but which is lower than the threshold level of said sensing units, means for transferring said low level signals corresponding to the first version of information to said first sensing unit so that only those low level signals which have at least a predetermined amplitude and pulse width reach the threshold level thereby discriminating against noise signals, means for transferring said high level signals corresponding to the second version of information to said second sensing unit so that those high level signals which have at least a predetermined amplitude and pulse width which is less than that required of the low level signals reach the threshold level thereby tending to accept weak signals, a comparison means, means for transferring signals corresponding to the first version of the information sensed by said first sensing unit to said comparison means, means for transferring signals corresponding to the second version of the information sensed by said second sensing means to said comparison means, and means operative under control of said comparison means for signalling an error if a difference is detected between the first and second version of the information.

11. Apparatus for checking information comprising a control device having a storing means and a sensing means so arranged as to permit information to be stored in a storage medium concurrently with the same information being sensed from said storage medium, means responsive to said sensing means for simultaneously producing a first and second version of the information being stored in said storage medium, a comparison means, means for transferring the first version of the stored information to said comparison means, means for transferring the second version of the stored information to said comparison means, said means for transferring the second version having a threshold level at which it accepts signals which is higher than the threshold level of the means for transferring the first version, and means associated with said comparison means for producing an indication of an error in the information stored in said storage medium.

12. A checking device comprising means for transmitting signals corresponding to information, a first and second sensing unit each having a different threshold level at which it responds to an input signal to produce an output signal, means responsive to said information signal transmitting means for simultaneously producing signals corresponding to a first and second version of the information transmitted by said transmitting means, means for transferring the first version of the transmitted information to said comparison means, means for transferring the second version of the transmitted information to said comparison means, and means associated with said comparison means for producing an indication of a difference between said first and second version of information transmitted by said transmitting means.

13. A device for checking information stored in a storage medium comprising means associated with said storage medium for producing signals corresponding to the information stored therein, a first and second sensing unit each having a different threshold level at which it responds to an input signal to produce an output signal, means responsive to said information signal producing means for simultaneously producing signals corresponding to a first and second version of the information stored in said storage medium, means for transferring the first version of the stored information to said comparison means, means for transferring the second version of the stored information to said comparison means, and means associated with said comparison means for producing an indication of an error in the information stored in said storage medium.

14. A device for checking information stored in a storage medium comprising means associated with said storage medium for producing signals corresponding to the information stored therein, a first and second sensing unit each having a threshold level at which it responds to an input signal to produce an output signal, means responsive to said informaiton signal producing means for simultaneously producing signals corresponding to a first and second version of the information stored in said storage medium, the signals corresponding to the first version of the information varying about a relatively low level with respect to the threshold level of said sensing units while the signals corresponding to the second version of the information varying about a relatively high level with respect to the low level but which is lower than the threshold level of said sensing units, means for transferring said low level signals corresponding to the first version of information to said first sensing unit so that only those low level signals which have at least a predetermined amplitude reach the threshold level, means for transferring said high level signals corresponding to the second version of information to said second sensing unit so that those high level signals which have at least a predetermined amplitude reach the threshold level, a comparison means, means for transferring signals corresponding to the first version of the information sensed by said first sensing means to said comparison means, means for transferring signals corresponding to the second version of the information sensed by said second sensing means to said comparison means, and means operative under control of said comparison means for signalling an error if a difference is detected between the first and second version of the information.

References Cited in the file of this patent
UNITED STATES PATENTS

| | | |
|---|---|---|
| 2,628,346 | Burkhart | Feb. 10, 1953 |
| 2,700,148 | McGuigan | Jan. 18, 1955 |
| 2,700,755 | Burkhart | Jan. 25, 1955 |
| 2,702,380 | Brustman et al. | Feb. 15, 1955 |
| 2,706,215 | Van Duuren | Apr. 12, 1955 |
| 2,802,940 | Burton | Aug. 13, 1957 |
| 2,807,005 | Weidenhammer | Sept. 17, 1957 |
| 2,824,222 | Furlow | Feb. 18, 1958 |
| 2,897,480 | Kumagai | July 28, 1959 |
| 2,939,110 | Beattie | May 31, 1960 |